United States Patent
Ball et al.

(10) Patent No.: US 10,216,803 B2
(45) Date of Patent: Feb. 26, 2019

(54) RANKING AND FILTERING COMMENTS BASED ON AUTHOR AND CONTENT

(71) Applicant: Facebook, Inc., Menlo Park, CA (US)

(72) Inventors: Allison Elaine Ball, Menlo Park, CA (US); Kaushik Mohan Iyer, Palo Alto, CA (US); Ashoat Tevosyan, New York, NY (US); Mikhail I. Okunev, Bellevue, WA (US); Erich James Owens, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 357 days.

(21) Appl. No.: 14/942,947

(22) Filed: Nov. 16, 2015

(65) Prior Publication Data

US 2017/0139921 A1    May 18, 2017

(51) Int. Cl.
*G06F 17/30* (2006.01)
*H04L 12/58* (2006.01)

(52) U.S. Cl.
CPC .... *G06F 17/3053* (2013.01); *G06F 17/30424* (2013.01); *G06F 17/30554* (2013.01); *G06F 17/30598* (2013.01); *H04L 51/16* (2013.01); *H04L 51/32* (2013.01)

(58) Field of Classification Search
CPC ..... H04L 51/16; H04L 51/32; G06F 17/3053; G06F 17/30424; G06F 17/30554; G06F 17/30598
USPC ....... 707/737, 748, 749, 750, 751, 752, 754, 707/755, 758; 705/319
See application file for complete search history.

(56) References Cited

U.S. PATENT DOCUMENTS

| | | | | |
|---|---|---|---|---|
| 9,152,675 | B2* | 10/2015 | Faller | G06F 17/3053 |
| 2012/0159635 | A1* | 6/2012 | He | G06Q 50/01 726/26 |
| 2013/0117261 | A1* | 5/2013 | Sambrani | G06F 17/30867 707/734 |
| 2013/0311907 | A1* | 11/2013 | Goldsmith | H04L 51/32 715/758 |
| 2013/0311943 | A1* | 11/2013 | Barcelo | G06Q 50/01 715/810 |

OTHER PUBLICATIONS

Hsu et al., Ranking Comments on the Social Web, 2009 International Conference on Computational Science and Engineering, vol. 4, pp. 90-97 (Year: 2009).*

(Continued)

*Primary Examiner* — Greta L Robinson
(74) *Attorney, Agent, or Firm* — Baker Botts L.L.P.

(57) ABSTRACT

In one embodiment, a method includes retrieving a plurality of comments associated with a content object on a social-networking system, determining a score for each of the comments, wherein the score is based on one or more signals associated with the comment, and where the signals are related to the identity of an author of the comment or content of the comment, ordering the comments based on the respective scores, and presenting one or more of the ordered comments to a target user. The method may further include excluding one or more of the comments based on a filtering condition. One of the signals may be based on how many times the comment has been (a) liked, (b) hidden, (c) marked as spam, or (d) replied to within a specified period of time. One of the signals may be based on a reputation of the author of the comment.

20 Claims, 18 Drawing Sheets

(56) References Cited

OTHER PUBLICATIONS

Cen et al., Ranking Weblogs by Analyzing Reading and Commenting Activities, 2009 IEEE/WIC/ACM International Joint Conference on Web Intelligence and Intelligent Agent Technology, vol. 1, pp. 442-449 (Year: 2009).*

* cited by examiner

FIG. 4A

| Author | Counts for this post | | | | Counts for all other posts | | | | Total counts for all posts | | | |
|---|---|---|---|---|---|---|---|---|---|---|---|---|
| | Like count | Hidden count | Spam count | Reply in time count | Like count | Hidden count | Spam count | Reply in time count | Like count | Hidden count | Spam count | Reply in time count |
| Jake | 2 | 10 | 20 | 1 | 2 | 24 | 38 | 10 | 4 | 34 | 58 | 11 |
| Nick | 0 | 4 | 0 | 0 | 17 | 9 | 2 | 1 | 17 | 13 | 2 | 1 |
| Sarah | 0 | 1 | 0 | 3 | 23 | 3 | 0 | 7 | 23 | 4 | 0 | 10 |
| Emma | 3 | 0 | 0 | 0 | 36 | 2 | 0 | 5 | 39 | 2 | 0 | 5 |

RANKING AND FILTERING COMMENTS BASED ON AUTHOR AND CONTENT

TECHNICAL FIELD

This disclosure generally relates to ranking and filtering content items in a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Content on a social-network page, such as a post or article, can have numerous user-contributed comments, some of which may be of greater interest to a viewing user than others. In particular embodiments, the user experience for reading and posting comments may be improved by identifying comments that are likely to be of interest to viewing users, and displaying those comments in a prominent location, such as near the top of the comment list. The comments of interest may be, for example, comments that people are reading and replying to, that provide interesting context for and information relevant to the post, are well-written, are written by authors known to write good comments, and so on. Comments of interest may be identified by determining scores for the comments based on signal values, which may quantify features of the comments and/or features of other entities in the social-networking system, such as posts or users. The comments of interest may be presented in an order according to their scores, with the highest-scoring comments being presented at the top of the comment list. The comments may also be filtered, in which case comments that satisfy filtering criteria, e.g., having scores above a threshold value, are presented.

The signal values may be related to aspects of comments, users, and user interactions. In particular embodiments, the signal values may be determined based on the author and content of the comments, the audience of users who view and interact with the comments (such as the user's friends), labelling of the comments by a text classifier, users' interactions with social-network news feeds, impression calculations involving interactions by historical users with the comments, and other aspects of the social-networking environment that involve interactions with comments and/or users. One or more of these signals may be used to determine a score for each comment. When multiple signals are used for a single comment, the comment's score may be determined as an average of the signal values.

In particular embodiments, the comments associated with a post may be ranked and filtered based on author-related and content-related features of the comments. A score for each comment may be computed as a sum of the signal values for that comment, and the signal values for each comment may be determined based on the author-related and content-related features of the comment. Author-related features may be used, for example, to generate an author reputation signal based on a number of times content attributed to the author has been (a) liked, (b) hidden, (c) marked as spam, or (d) replied to within a specified period of time. Content-related signals may include an originality level of the comment text, which may be based on how similar the text is to text in a corpus of text associated with the online social network. A grammar-quality signal may be based on the quality of grammar in a comment's text. A valid URL signal may be set to a positive value if the comment contains a valid URL, or zero otherwise. A relevant text signal may be based on a relevance comparison between text of the post or article and text of the comment. A promotional signal may be based on a level of promotional content identified in the comment. A text entropy signal may be based on an amount of meaningful content in the comment.

In particular embodiments, comments social-network pages may be ranked and filtered based on audience interactions with the comment. For example, a score may be determined for each of the comments. The score may be based on one or more signals, the signals being associated with the comment and related to interactions by audience members with the comment. These audience interactions may include how users in the author's social network or admins have been interacting with the comment, and the author's responses to those interactions.

In particular embodiments, comments may be ranked and filtered for presentation to target user based on a history of user interactions with the target user's newsfeed. The user interactions may include liking, posting, or sharing a comment on the target user's newsfeed. Marking a comment as disliked, spam, or hidden, friending, unfriending, following, or unfollowing another user are also examples of user interactions with a newsfeed. Each interaction that relates to a comment may be evaluated to determine a numeric signal value, e.g., a positive or negative value to be added to the comment's ranking score. The sign and magnitude of the value may be determined by a signal that is selected based on the type of interaction. The signal may specify a static value or a dynamic rule that can generate a value based on the specific interaction. For example, a user interaction of liking a comment may statically set the signal value to a positive value, e.g., 0.1. A user interaction of marking a comment as spam may statically set the signal value to a negative value, e.g., −0.2. The signal values determined based on feed interactions related to a comment may be added to the comment's ranking score to influence the position of the comment in the list produced by the ranking and filtering operations.

In particular embodiments, a labelling technique may be used to identify one or more labels that describe to the content of a comment, and adjust the comment's ranking among a list of comments based on the identified labels. The labelling technique may use a comment classifier that identifies labels under which the comment may be classified, such as Anecdotal, Eloquent, Descriptive, Promotional, and others. For example, a comment may be labeled promotional if it contains content deemed promotional, e.g., "Like me", "Follow me", etc. A comment may be labeled Eloquent if it contains good grammar. The ranking of comments may be based on ranking scores associated with each comment, and a comment's ranking score may be a sum of the signal values that are based on the comment. Each of the labels identified for a comment may be mapped to a positive or negative signal value. Labels that denote positive qualities, such as the Eloquent and Descriptive labels, are mapped to positive signal values that contribute to raising the comment's ranking score. Labels that denote negative qualities, such as the Promotional label, are mapped to negative signal values that contribute to lowering the comment's ranking score. Thus the signal value(s) used to score a comment may be based on the label(s) identified for the comment, and on other factors such as a degree to which the label applies to the comment, which may be based on a confidence value associated with each label by the comment classifier.

In particular embodiments, comments in an online social network may be ranked and filtered for presentation to a target user based on user impressions, such as interactions by a user with the comment. This comment-related impression calculation involves looking beyond simple binary data about how users interaction with comments, e.g., whether a user clicked on a link, clicked "Like," or replied (or whether the user read the article or not before commenting). Such impression calculation algorithms may help to make a deeper qualitative assessment of the comment based on, for example, a user's reaction to viewing the comment.

A score may be determined for each of the comments based on a qualitative analysis of each of one or more impressions related to the comment, and where each of the impressions includes a past interaction by a historical user with the comment. The comments may be presented to the target user in a sorted order based on the respective scores. The qualitative analysis may determine a category of interaction for the impression, and the score may be based at least in part on the category of interaction and a degree of the interaction. The category of interaction may be user input related to the comment. The user input may be a mouseover of the comment, a request for expansion of the comment, scrolling within the comment, and other user-interface input. The comment's score may be increased if the user input indicates that the user is viewing or interacting with a comment, or decreased if the user input indicates that the user has stopped viewing the comment, e.g., by navigating away from the comment. The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, where any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, where each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4A illustrates an example of signal values for comments associated with a post.

FIG. 4B illustrates an example of comment-related action counts associated with users.

FIGS. 5A and 5B illustrate example orderings of comments by score.

DESCRIPTION OF EXAMPLE EMBODIMENTS

Figure 1:
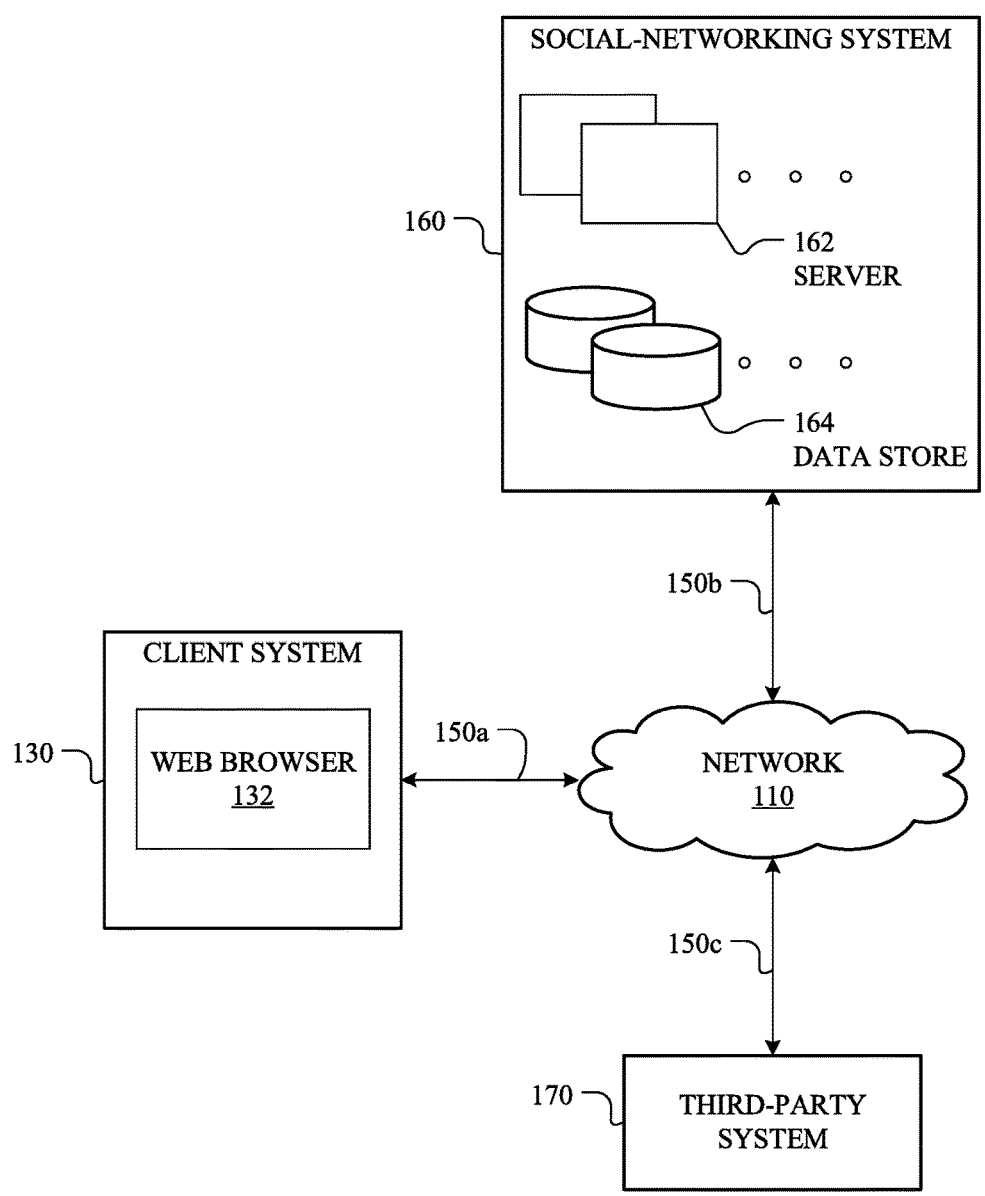
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150a,b each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150c, or a combination of two or more such links 150. Links 150 need not necessarily be the same throughout network environment 100. One or more first links 150a may differ in one or more respects from one or more second links 150b,c.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
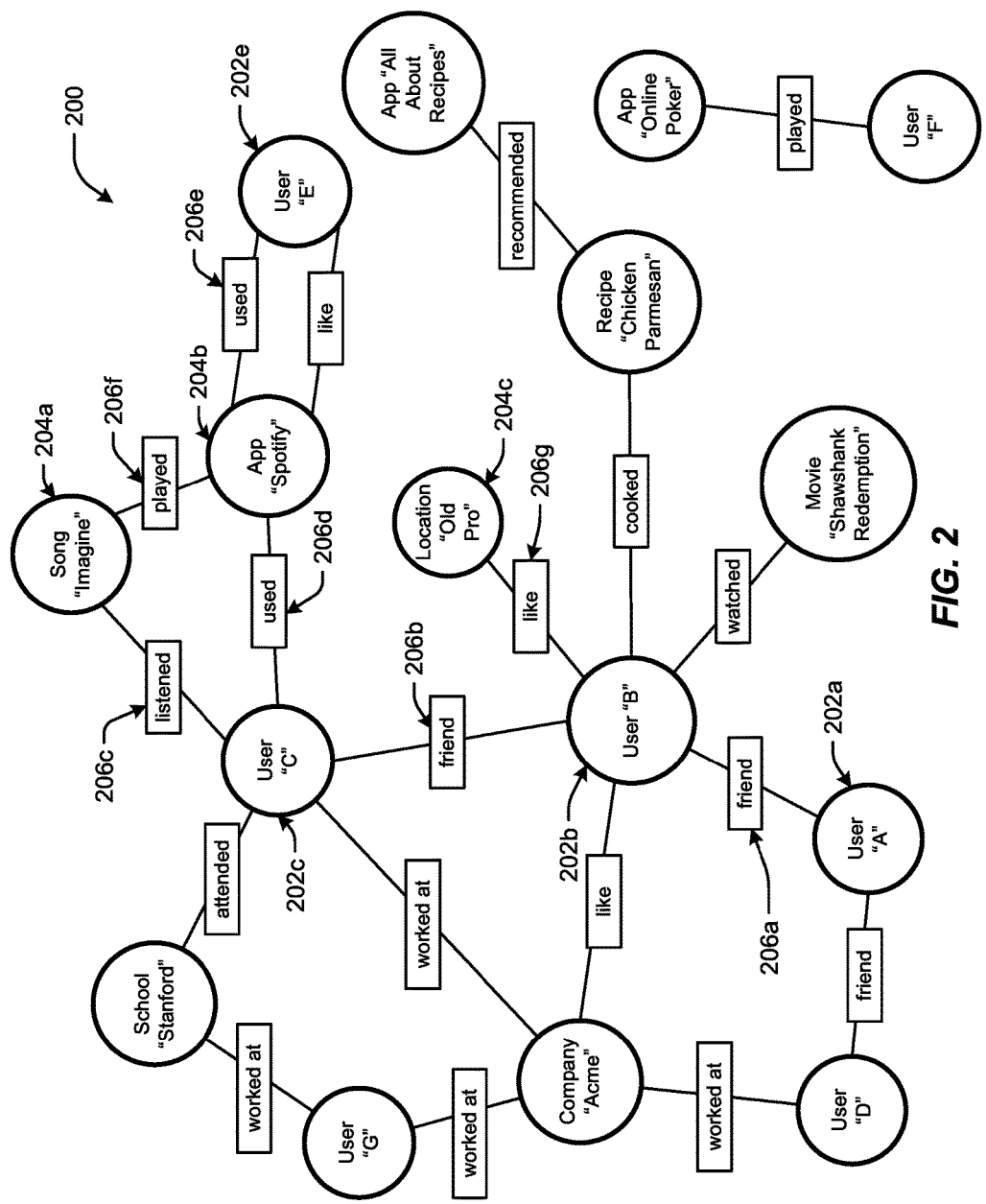
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206a indicating a friend relation between user nodes 202a,b of user "A" and user "B" and an edge 206b indicating a friend relation between user nodes 202c,b of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206c and a "used" edge 206d (as illustrated in FIG. 2) between user nodes 202c corresponding to the user and concept nodes 204a,b corresponding to the song and application to indicate that the user listened to the song and used the application. Moreover, social-networking system 160 may create a "played" edge 206f (as illustrated in FIG. 2) between concept nodes 204a,b corresponding to the song and the application to indicate that the particular song was played by the particular application. In this case, "played" edge 206f corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202e for user "E" and concept node 204b for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206g between the user node 202b and concept node 204c. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3A:
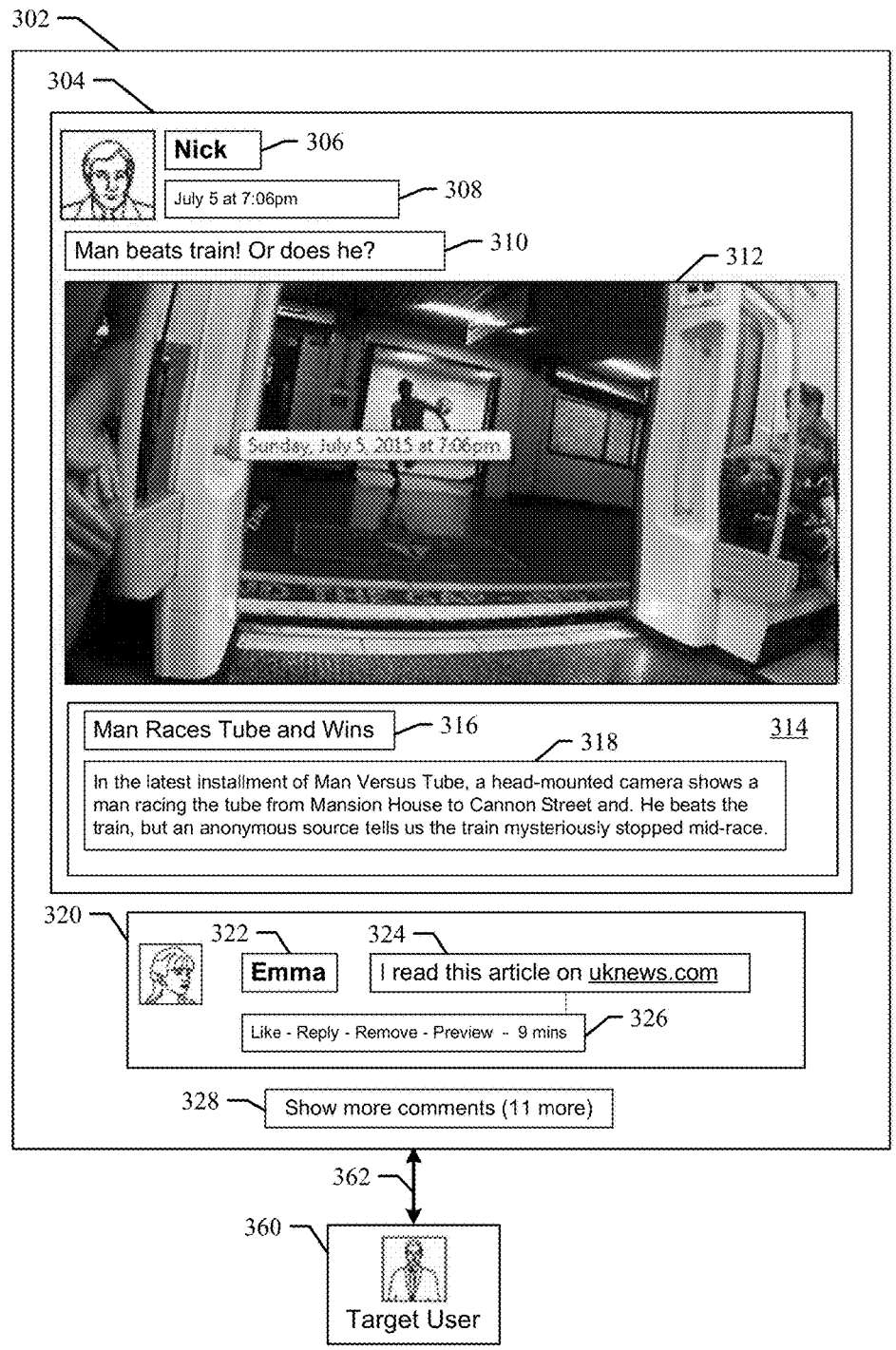
FIGS. 3A-3C illustrate an example of comments associated with a post in a social-networking system.
Figure 3B:
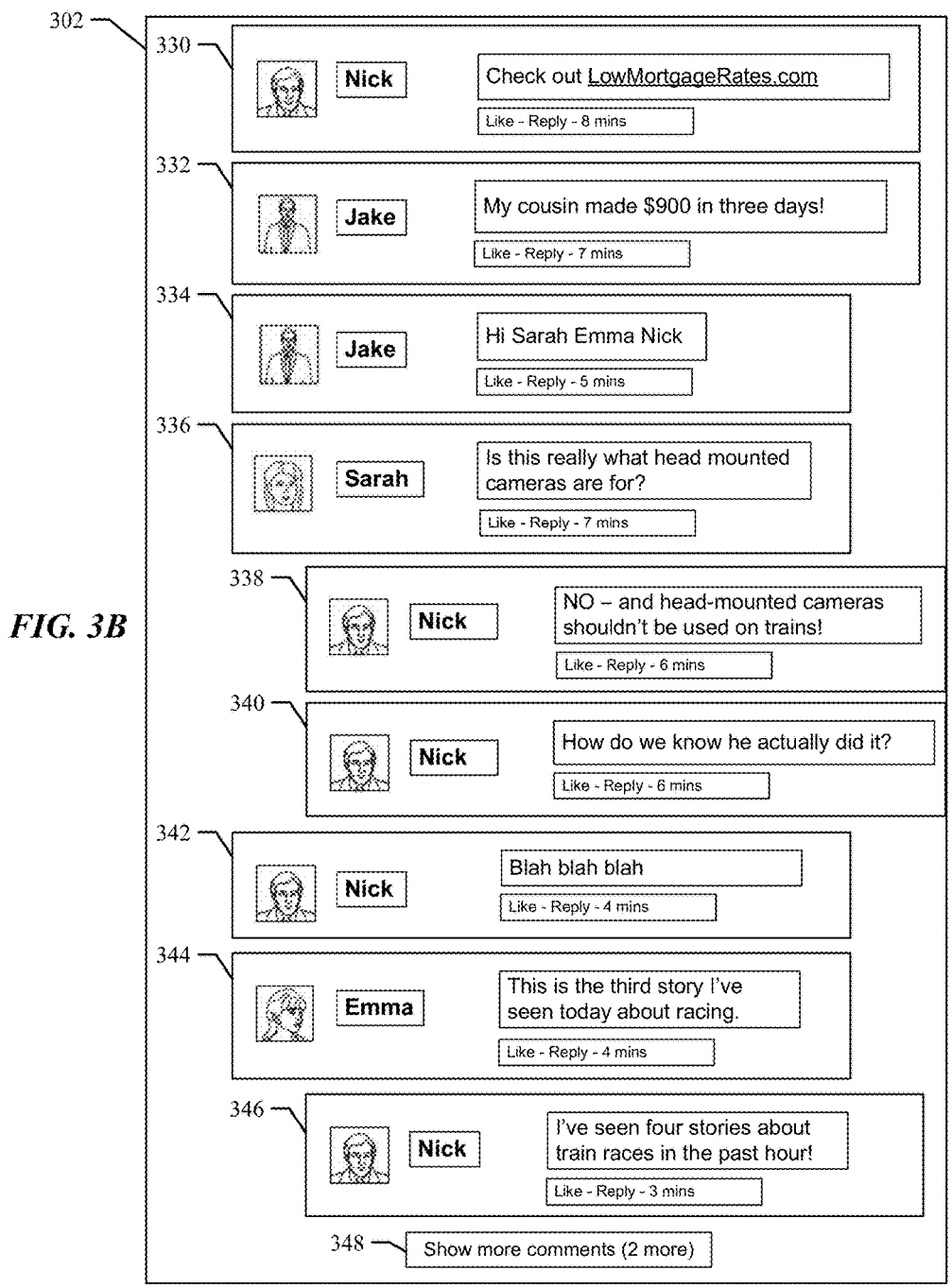
Figure 3C:
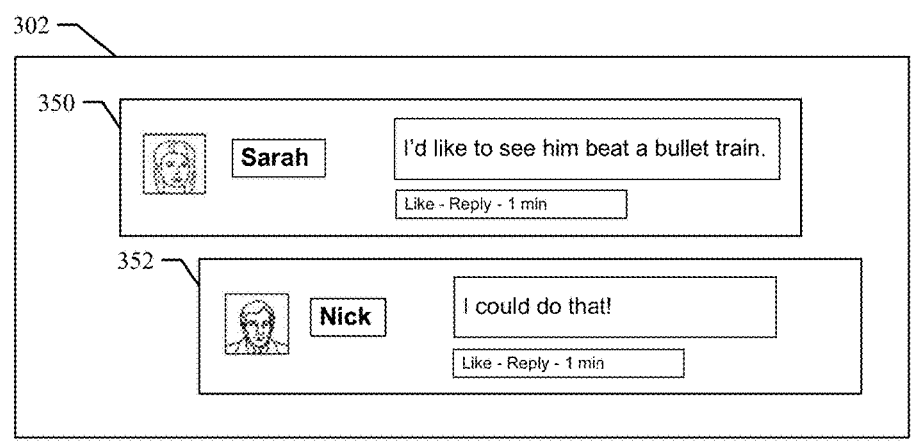

FIGS. 3A-3C illustrate an example of comments associated with a post in a social-networking system. Referencing FIG. 3A, a user interface 302 may be presented by a web browser 132 or native application on a display of a client system 130. A user of the client system 130 may view the post 304 and the comments 320. Such a user viewing the post 304 and/or comments 320 is referred to herein as a "target user." The user interface 302 may provide access to the social-networking system 160, and may display a social-network post 304 and associated comments 320. A user may read the posts and comments, and reply to the post and comments by selecting a Reply option on an action menu 326. The post 304 includes a post author name 306 ("Nick"), a post date 308 indicating that the post was posted on July 5 at 7:06 pm, text content 310 ("Man beats train! Or does he?"), image content 312 showing a man running near a train, and additional text content 314. The additional text content 314 includes a title 316 ("Man Races Tube and Wins") and detailed text content 318 ("In the latest installment of Man Versus Tube . . . "). A comment 320 posted in response to the post 304 by a user named Emma is displayed below the post 304. The comment 320 is a comment on the post 304, as opposed to a comment on another comment. The comment 320 is therefore referred to herein as a "direct" response to the post 304. The comment 320 includes a comment author name 322 ("Emma"), text content 324 ("I read this article on uknews.com"), and the action menu 326, which includes Like, Reply, Remove, and Preview actions that can be selected by the target user viewing the user interface 302 to perform the respective social network actions, e.g., liking, replying, removing, or previewing the post. The action menu 326 also includes an indication that the comment was posted 9 minutes ago. The target user may request that more comments be displayed by selecting (e.g., clicking on or touching) a button 328 labeled "Show more comments." When the user selects the button 328, additional comments may be displayed below the comment 320. These additional comments may be displayed in the user interface 302 adjacent to the comment 320 (which may be displayed adjacent to the post 304), but are shown in FIGS. 3B and 3C for clarity.

Referencing FIG. 3B, the user interface 302 displays comments 330-346 when, for example, the target user (e.g., the user viewing the comments) selects the button 328 to show more comments. Comments 330-336 and 342-346 are direct responses to the post 304. Comments 338 and 340 are responses to the comment 336, and comment 346 is a response to the comment 344, as described below. Comment 330 by an author Nick has text content "Check out LowMortgageRates.com." Comment 332 by an author Jake has text content "My cousin made $900 in three days." Comment 334 by Jake has text content "Hi Sarah Emma Nick." Comment 336 by Sarah has text content "Is this really what head mounted cameras are for?" Comment 338 by Nick is a response to comment 336 and has text content "No—and head-mounted cameras shouldn't be used on trains!" Comment 340 by Nick is a response to comment 336 and has text content "How do we know he actually did it? Comment 342 by Nick has text content "Blah blah blah." Comment 344 by Emma has text content "This is the third story I've seen today about racing." Comment 346 by Nick is a response to comment 344 and has text content "I've seen four stories about train races in the past hour!" The target user may request that more comments be displayed by selecting a button 348 labeled "Show more comments." Referencing FIG. 3C, the user interface 302 displays comments 350, 352 when the target user selects the button 348. Comment 350 by Sarah has text content "I'd like to see him beat a bullet train." Comment 352 by Nick is a response to comment 350 and has text content "Hi I could do that!"

Content on a social-network page, such as a post or article, can have numerous user-contributed comments, some of which may be of greater interest to a viewing user than others. In particular embodiments, the user experience for reading and posting comments may be improved by identifying comments that are likely to be of interest to viewing users, and displaying those comments in a prominent location, such as near the top of the comment list. The comments of interest may be, for example, comments that people are reading and replying to, that provide interesting context for and information relevant to the post, are well-written, are written by authors known to write good comments, and so on. Comments of interest may be identified by determining scores for the comments based on signal values, which may quantify features of the comments and/or features of other entities in the social-networking system, such as posts or users. The comments of interest may be presented in an order according to their scores, with the highest-scoring comments being presented at the top of the comment list. The comments may also be filtered, in which case comments that satisfy filtering criteria, e.g., having scores above a threshold value, are presented.

The signal values are, for example, related to aspects of comments, users, and user actions, such as the author of the comments, content of the comments, the audience of users who view and interact with the comments (such as who the user's friends are, and what the user is interested in), labelling of the comments by a text classifier, users' interactions with social-network news feeds, impression calculations in which impressions include interactions by historical users with the comments, and other aspects of the social-networking environment that involve interactions with comments and/or users.

In particular embodiments, the social-networking system 160 may retrieve a plurality of comments associated with a content object. For example, the comments may have been submitted by users of the social-networking system 160 as responses to a post. The comments may be retrieved by a server 162 from a data store 164 hosted by the social-networking system 160.

Figure 4A:
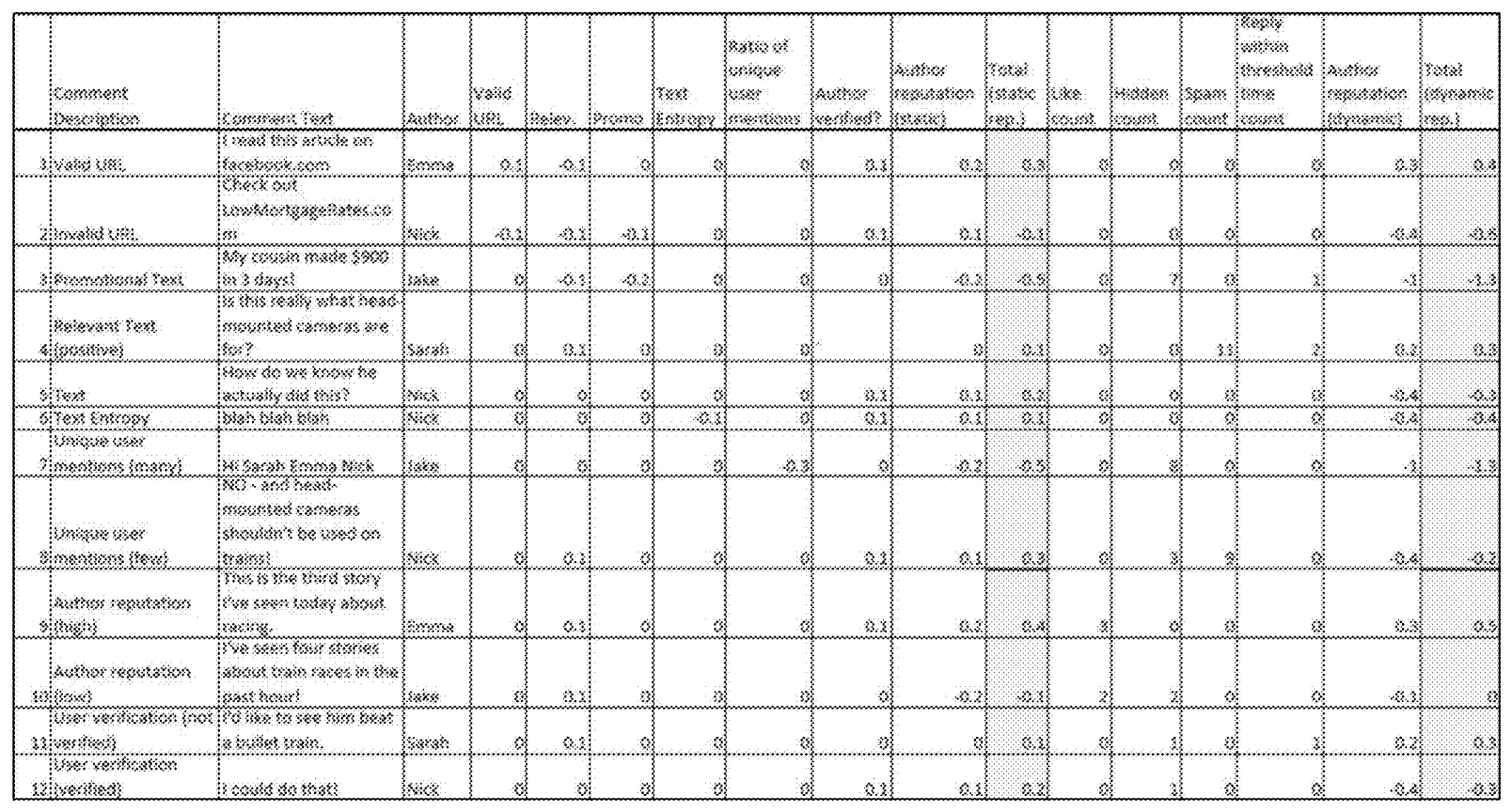

In particular embodiments, the social-networking system 160 may determine a score for each of the comments, where the score is based on one or more signals associated with the comment, and the signals are related to the identity of an author of the comment or to content of the comment. FIG. 4A illustrates an example of signal values for the comments 320-352 associated with the post 304 of FIG. 3A. The comments 320-352 are numbered 1-12, respectively, in the signal table shown in FIG. 4A. The signals may be floating point values, and may be positive values to cause the comment to be up-ranked, or negative values to cause the comment to be down-ranked by the magnitude of the signal value. In the examples discussed herein, the signal values range from −1.0 to 1.0. The comments shown in FIG. 4A are from the example of FIGS. 3A-3C. In particular embodiments, signals may be associated with conditions to form conditional signals A conditional signal may have a signal value when the associated condition is true. When the condition is false, the conditional signal may have no signal value, so that the signal does not apply and is not included in calculations that reference the signal. The signal may have a value of 0 when the condition is false, in which case the value 0 may be used for the signal value in calculations that reference the signal. The particular value of a conditional signal when the condition is false may be determined by instructions specific to that signal. As an example and not by way of limitation, a geographic boost signal may have a positive value when a location associated with a post is in a certain geographic region. The geographic boost signal may be a conditional signal that does not apply to the score calculation when no location is specified in the post. The geographic boost signal may be a conditional signal that boosts the score when the location associated with the post is in the certain location, and does not affect the score when no geographic location is specified in the post.

As introduced above, the values of the signals may be used to up-rank good comments and down-rank bad comments. For example, a signal that represents the quality of a content's grammar may have positive floating-point values between 0 and 1 to indicate that the quality is good. Positive signal values increase the comment's score. The comment's score may be based on a combination of the values of the comment's signals, e.g., an average of the signal values. Thus, a quality signal value of positive 0.7 adds a contribution of 0.7 to the sum of the signals that contribute to the score, which is divided by the number of contributing signals to determine the comment's score. The signal may have negative values to indicate that the quality is bad, e.g., a poorly-written comment may have a quality signal value of −0.4, which adds a contribution of −0.4 to the sum of the contributing signals, thereby decreasing the sum by 0.4 and lowering the average (and thus the comment's score) accordingly. As another example, a signal that represents the quality of a content's grammar may have positive floating-point values between 0 and 1 to indicate that the quality is good, and negative values between −1 and 0 to indicate that the quality is bad. Positive signal values increase the comment's average score, and negative signal values decrease the comment's average score.

In particular embodiments, the score for each of the comments may be determined based upon an average of the respective values of the one or more signals associated with the comment. For example, the score for a comment may be calculated as the average of one or more of the signal values associated with the comment, as shown in FIG. 4A.

In particular embodiments, each signal may have a weight, and the average may be a weighted average in which the respective value of the signal is multiplied by the weight of the signal. The average of the signal values is used for the comment's score. Individual signals may be weighted by a weighting factor, e.g., a weight of 2 for the Valid URL signal would give that signal twice the weight of other signals that have a weight of 1 in a computation of a weighted average signal value used for the score. For example, a signal value of 0.2 with a weight of 2 would result in a contribution of 0.4 to the score, e.g., 4 times greater than a contribution of 0.1. Larger signal values such as 0.2 and/or larger weights such as 2 may be used for signals that are deemed to be particularly important and are to have greater influence on the score than signals that have smaller values and/or smaller weights. The weights may be determined by manual inspection and data analysis, and/or automated variation of weights, with A/B tests to verify whether the model is producing good values for the weights, e.g., by determining whether user behavior changes in a positive way as weights are varied.

In particular embodiments, one of the signals may be based on an originality level for text of the content object or for one or more images of the content object. The social-networking system 160 may determine the originality level by identifying one or more clusters of similar text in a corpus of text associated with the online social network. The originality level signal of the comment text may be is inversely proportional to a cluster size of the one or more clusters of similar text. For example, a Text Originality signal may be set to a positive value, e.g., 0.1, if the comment text does not contain any of the clusters of similar text. The Text Originality signal may be set to a negative value, e.g., −0.1, if the text contains one of the clusters, to −0.2 if the text contains two of the clusters, and so on, to a signal value of −1.0 for more than a threshold number of clusters (e.g., 5).

In particular embodiments, one of the signals may be based on an originality level of photos that are included in comments. For example, photos that are unpopular on a page may cause the originality level to be set to a negative value. As another example, photos that are determined to be memes, which are ordinarily not relevant to a specific conversation, may cause the originality level to be set to a negative value. Meme photos may be detected by, e.g., identifying photos that appear in otherwise unrelated comment threads or posts.

In particular embodiments, one of the signals may be based on a grammar quality level of text of the content object. In particular embodiments, the social-networking system 160 may determine the grammar quality level of the text of the content object by generating corrected text from the text of the content object using a grammar correction algorithm, and comparing grammar quality of the text of the content object to grammar quality of the corrected text, where the one of the signals is proportional to the similarity of the text of the content object to the corrected text. For example, a Grammar Quality signal may be set to 0.5 if no corrections to the comment text are identified, to 0 if a small number of corrections are identified (e.g., 1 or 2 corrections), and to −0.1 or lower (with a magnitude proportional to the number of corrections identified) if more than the small number of corrections are identified, to a lower limit of 1.0 for more than a threshold number of corrections (e.g., 10).

In particular embodiments, one of the signals may be based on whether the content object includes an invalid URL. As an example of a valid URL, referencing FIG. 4A, for comment 1, the text content is "I read this article on uknews.com" and the author is Emma. Comment 1 provides an example for the Valid URL signal because the comment text contains a URL. The Valid URL signal has the value 0.1 for the first comment because the URL ("uknews.com") in the comment is valid (e.g., is registered with a domain name service, or resolves to a web site that hosts a valid web page, or is otherwise determined to be valid). The signal value is set to positive 0.1, which indicates that the Valid URL signal makes a positive contribution to the score for this comment, e.g., moves the comment in the upward direction (towards the top of the list) by the magnitude of the signal (0.1). The signal value does not necessarily cause the comment's ranking to change, since the magnitude of the signal value may be insufficient to increase the score by an amount sufficient to exceed the score of the next-higher-ranked comment (if any). Other values may be used for the signal instead of 0.1, e.g., 0.01 to represent a smaller positive contribution, or 0.5 or 1.0 to represent a larger positive contribution. The Valid URL signal is an example of a conditional signal for which the condition is that the comment contains a URL. If the comment does not contain a URL, then the value of the Valid URL signal may be set to 0.

As an example of an invalid URL, referencing FIG. 4A, comment 2 has text "Go to LowMortgateRates.com" and author Nick, and is an example comment for which the Valid URL signal contributes a negative signal value to the comment's score. In this example, the URL LowMortgageRates.com is known or determined to be invalid (e.g., not registered with a domain name authority, and/or does not resolve to a valid web server or web page). Since the URL is invalid, the signal value is set to −0.1, which, notwithstanding other signals, reduces the score and moves the comment towards the bottom of the comment list by an amount equal to the magnitude of the signal (0.1). Including the value −0.1 in the calculation of the average signal value reduces the average, and therefore reduces the score of the second comment. As described above for positive signal values, other values may be used instead of −0.1, e.g., −0.01 to represent a less negative contribution, or −0.5 or −1.0 to represent a greater negative contribution. Also, as indicated above, the signal may or may not cause the comment's ranking to change, depending on the difference between the comment's score and the score of the next-lowest-ranked comment (if any).

In particular embodiments, one of the signals may be based on a relevance comparison between text of the content object and text of the comment. As an example, comment 4 has text "Is this really what head mounted cameras are meant for?" and author Sarah. Comment 4 is identified as text that is relevant to the post, e.g., because comment 4 mentions the phrase "head mounted cameras," and that phrase, which occurs infrequently, and present in the post. The Relevant Text signal is therefore set to 0.1 for comment 4. The magnitude of the signal may be set proportionally to a degree of relevancy of the comment text to the post text. For example, if the comment text is determined to be very relevant, the signal may be set to 0.9 or 1.0. If the comment is found to be slightly relevant, the signal may be set to 0.05 or 0.1. The degree of relevancy may be determined by measuring text similarity, e.g., by counting the number of words in common between the comment and the post, such that the relevant text signal is proportional to the number of words in common, and the length of words and phrases that are present in both the comment and the post. As another example, a topic of the post text may be identified, e.g., "trains" or "cameras", and compared to topics of the comment text. The Relevant Text signal may then be set proportionally to the number of topics in common. For example, if the topic "cameras" is identified in both the post and the comment, then the relevant text signal may be increased by 0.1. If no relevant text is identified, then the relevant text signal may be set to 0, as shown for comments such as "How do we know he actually did it" (comment 5) and "Hi Sarah Emma Nick" (comment 7), neither of which is identified as relevant because of lack of words or topics in common with the post. As another example, the comment text may be found to be irrelevant to the post text with high confidence, in which case the relevant text signal may be set to a negative value. For example, comments that are found to be promotional may also be considered highly irrelevant, so the Invalid URL and Promotional Text comments have negative values for their relevant text signals. Comments that contain text commonly found in irrelevant comments, e.g., "Go to LowMortgageRates.com" may have negative relevant text signals, as shown for the Invalid URL signal.

In particular embodiments, one of the signals may be based on a level of promotional content identified in the comment. As an example, comment 3 has text "My cousin made $900 on the Internet" and author Jake. Comment 2 is identified as a promotional content, so the value of the Promotional signal is set to a negative value (−0.2 in this example) to provide a negative contribution to the score for comment 2. The value of the Promotional signal may be proportional to the degree of the promotion or to confidence in the determination that the signal is promotional. For example, comment 3 may be identified as being more likely to be promotional than comment 2, since comment 3 contains commonly-seen promotional language about making money on the Internet, and comment 2 refers to an unverified web site that may be considered a kind of promotion. Therefore, the Promotional signal is set to −0.2 for comment 3, and −0.1 for comment 2, since comment 3 appears to be more likely to be a promotion than comment 2 (or, in other words, comment 3 meets criteria for a type of promotion that is weighted as more promotional than the type for which comment 2 meets criteria). In the example of FIG. 4A, there are not positive values for the Promotional signal, because lack of promotional content is not considered to be a strong enough reason to up-rank a comment. In other examples, if comments that do not contain promotions are considered much more interesting or informative than comments that do contain promotions, a positive value may be assigned to the Promotional signal for comments that do not appear to contain promotions (e.g., have no promotional text).

In particular embodiments, one of the signals may be based on a level of text entropy in the content of the comment. As an example of the Text Entropy signal, comment 6 has text "blah blah blah" and author Jake. Comment 6 is identified as text having low entropy, e.g., low information content, because it merely contains the words "blah" and the word is repeated. Certain words, such as "blah" and "LOL" may be recognized as low-entropy content. Repetition of a word, particularly if there is no other text in the comment, may also be recognized as low-entropy content. Other text, such as "???" or emoji symbols, may also be recognized as low-entropy content. Presence of low-entropy content in a comment causes the Text Entropy signal to be set to a negative value, e.g., −0.1 for the text "blah bah blah" in comment 6. Low-entropy content may also be detected by counting the number of words in a post, and assigning a Text Entropy value of −1 to comments having no text, −0.9 to comments having one character, −0.8 to comments having one word, −0.7 to comments having two words, and so on, until at least a threshold number of words is found (e.g., 4), at which point the entropy is not based on the number of words. Text that repeats the same words or patterns of characters may also be recognized as low-entropy content. Exceptions may be made for certain types of content, e.g., web links, which may have relatively few words and characters, but may be assigned an entropy signal value of 0, because they may refer to useful information.

As another example of the Text Entropy signal, comments that are of substantial length, e.g., greater than 100 words or 500 characters, or greater than some other predetermined threshold, may be assigned a positive Text Entropy signal value. Comments that are extremely long, e.g., greater than 500 words or 2500 characters, may be assigned a Text Entropy signal value of 0, since such long comments are rare. If present, long comments may have been pasted from elsewhere, so the amount of useful information in a long comment is less likely to be related to the length of the comment.

In particular embodiments, the social-networking system 160 may determine a ratio of unique user mentions in the comment to a quantifying value for the content of the comment, where, for at least one of the excluded comments, the respective ratio satisfies a threshold value. As an example, comment 7 has text "Hi Sarah Emma Nick" (or similarly, Hi @sarah @emma @nick) and author Jake. Comment 7 is identified as having a relatively large number of unique user mentions. Such comments contain little content, especially when the number of user mentions or characters used for user mentions is a substantial portion (e.g., greater than 20% or greater than 80%) of the comment's text. In this example, since three of the four words in the comment are user mentions, the Ratio of Unique User Mentions signal is set to −0.1 as a negative contribution to the comment's ranking. Since most comments are likely to have no user mentions, there is no positive contribution to the score for the Unique User Mentions signal in this example.

In particular embodiments, one of the signals may be based on a reputation of the author of the comment. In particular embodiments, the reputation of the author may be based on a number of times content attributed to the author has been (a) liked, (b) hidden, (c) marked as spam, or (d) replied to within a specified period of time. As an example, the Author Reputation signal up-ranks comments made by authors who have received positive feedback on their comments, based on actions taken by other users on the author's comments (e.g., liking the comments or replying to them within a threshold time). The Author reputation signal down-ranks comments made by authors who have received negative feedback on their comments, based on actions taken by other users on the author's comments (e.g., hiding the comments or marking them as spam). Two author reputation signals are shown in FIG. 4A: a static Author Reputation signal based on comments to the current post, and a dynamic Author Reputation signal based on comments to a set of posts. The Author Reputation signals may be calculated from the like count, hidden count, spam count, and reply in time count values associated with the post (for the static author reputation), and/or with other posts, for the dynamic author reputation signal. The like count is a count of how many times an author's posts have been marked as liked. The hidden count is a count of how many times the author's posts have been hidden. The spam count is a count of how many times the author's posts have been marked as spam. The reply in time count is a count of how many times the author's posts have been replied to by a comment within a threshold time, e.g., within 10 minutes, 30 minutes, 1 hour, or the like.

The author reputation signal value may be determined using a ratio based on those four counts, in which the like and reply-within counts are positive contributions and the hidden and spam counts are negative contributions. For example, the author reputation signal values may be determined using the formula (like+replywithin)/(hidden+spam), with values<0.5 shifted to negative numbers in the range (−1 . . . 0) and values>=0.5 shifted to positive numbers in the range (0 . . . 1).

The static author reputation values shown in the column labeled "Author reputation (static)" of FIG. 4A may be calculated using the ratio described above for the four count values (like, hidden, spam, and reply in time) of the single post for which the reputation is being calculated. Example total counts for the single post are shown in the table of FIG. 4B under the label "Counts for this post." These values are from the corresponding columns of FIG. 4A. The dynamic author reputation values shown in the column labeled "Author reputation (dynamic)" may be calculated using the ratio described above for averages of each of the four count values over a number of posts, such as all posts viewed by the target user, all posts received in a specified time period, or any other selected set of posts on which the author has commented. Example total counts for all posts are shown in the table of FIG. 4B under the label "Total counts for all posts."

The author reputation signals may be calculated based on the comment-related action counts for each user that are shown in FIG. 4B. Three sets of action counts are shown in FIG. 4B. For each of the users, Jake, Nick, Sarah, and Emma, the link count, hidden count, spam count, and reply in time count for the current post (for the static author reputation), labeled "Counts for this post," for all other posts in the set of posts being considered (an intermediate value, e.g., all posts having comments by at least one of the users for which the counts are being determined, optionally restricted to a certain time period), labeled "Counts for all other posts," and the total counts for both the current post and all other posts being considered (for the dynamic reputation), labeled "Total counts for all posts."

The comments listed in FIGS. 3A-3C and 4A are ordered according to the time at which they were received. For each comment, the signal table includes a description, the comment text, the author, a Valid URL signal, a relevance signal, a promotional signal, a text entropy signal, a ratio of unique user mentions signal, an author verification signal, a static author reputation signal, and a score (using the static reputation value) that is an average of the aforementioned signals.

In particular embodiments, one of the signals may be based on a user verification status of the author. An Author Verified signal up-ranks the comments of verified authors and makes no change to the ranking of comments by non-verified authors. Values for the Author Verified signal are shown in the "Author Verified?" column of FIG. 4A. In this example, the identities of the authors Emma and Nick have been verified, but the identities of Jake and Sarah have not been verified. Author identities may be verified using digital signatures, by receiving other proof of the author's identity, or by other appropriate means. Comments authored by the verified authors Emma or Nick, such as comments 1 and 2, respectively, have the value 0.1 in the "Author verified?" field. Comments authored by the unverified authors Jake and Sarah, such as comments 3 and 4, respectively, have the value 0 in the "Author verified?" field.

In particular embodiments, one of the signals may be based on a number of followers of the author in a social-networking system. In particular embodiments, the author quality signal may be further based on satisfaction of a threshold for an author quality level. For example, an author quality signal for comments by a particular author may be proportional to the number of followers the author has, up to a limit of 1.0 for a threshold number of followers (e.g., 100, 1000, 5000, or the like). The author quality signal may be 0 if the author has no followers. If the author has at least 1 follower, the author quality signal may be set to 0.1. If the author has at least a threshold number of followers, e.g., 100 or 1000, then the author quality signal may be set to a first value such as 0.2. If the author has more than the threshold number of followers, the author quality may be set to s second value such as 0.3. As another example, an author quality level signal may be calculated as an average of the signal values of the authors posts and/or comments. The average may be calculated for a particular time, e.g., for all posts and/or comments made by the author in the past month or year. Alternatively, the average quality level may be an average of a selected set of signals, such as the Grammar Quality signal and the Relevant Text signal, either for all posts or comments made by the author, or for posts or comments made in a particular time period.

Figure 5A:
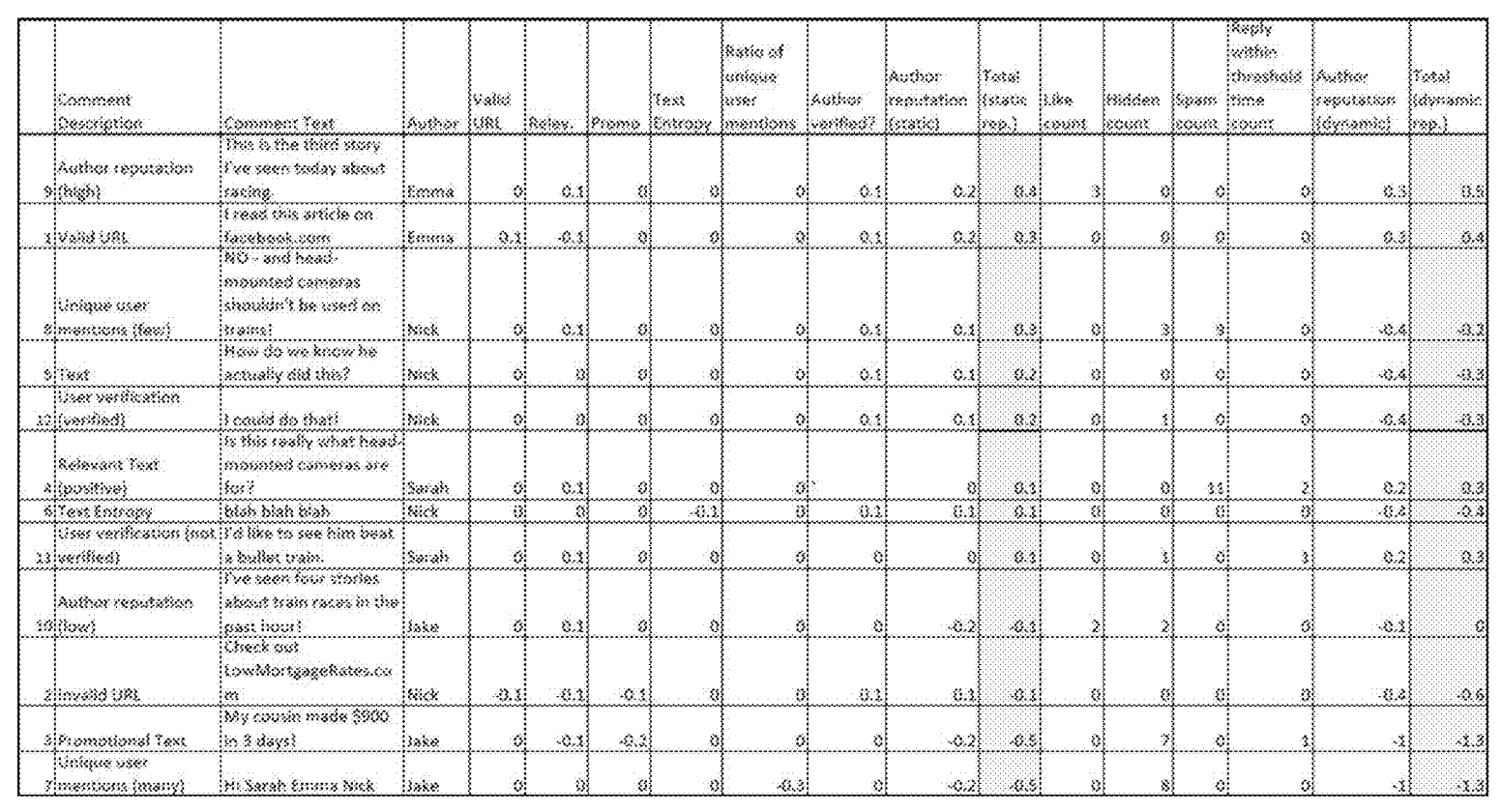

In particular embodiments, the social-networking system 160 may order the comments based on the respective scores. FIG. 5A illustrates an ordering of the comments 320-352 according to static scores, which are scores calculated using the signals shown in the signal table, including the static author reputation but not the dynamic author reputation. That is, the comments shown in FIG. 5A are sorted by the "Total (static rep.)" column in descending order. These comments may be presented to a user in the order shown in FIG. 5A. Although ordering in a particular direction (e.g., the comment having the highest score is presented at the top of the list, with up-ranking moving a comment toward the top of the list) and the highest-scoring comment being at a particular location relative to the other comments (e.g., the top of the list), ordering in other directions and placing the highest-scoring comment at other locations is contemplated. For example, the comments may be presented in order of ascending score, in which case the comment having the lowest score may be presented at the top of the comment list, and the comment having the highest score may be presented at the bottom of the comment list. Further, up-ranking may refer to moving a comment to a position that indicates a higher ranking, and is not necessarily restricted to moving a comment in an upward direction. Although scores are described as floating-point values between −1 and 1, with increasing values corresponding to higher-ranked scores, other score representations are contemplated. For example, this disclosure contemplates scores that may be integer values, may be bounded other values, e.g., a lower limit of 1 and an upper limit of 50, and/or may have other ordering relations, e.g., a relation in which higher values correspond to lower rankings.

Figure 5B:
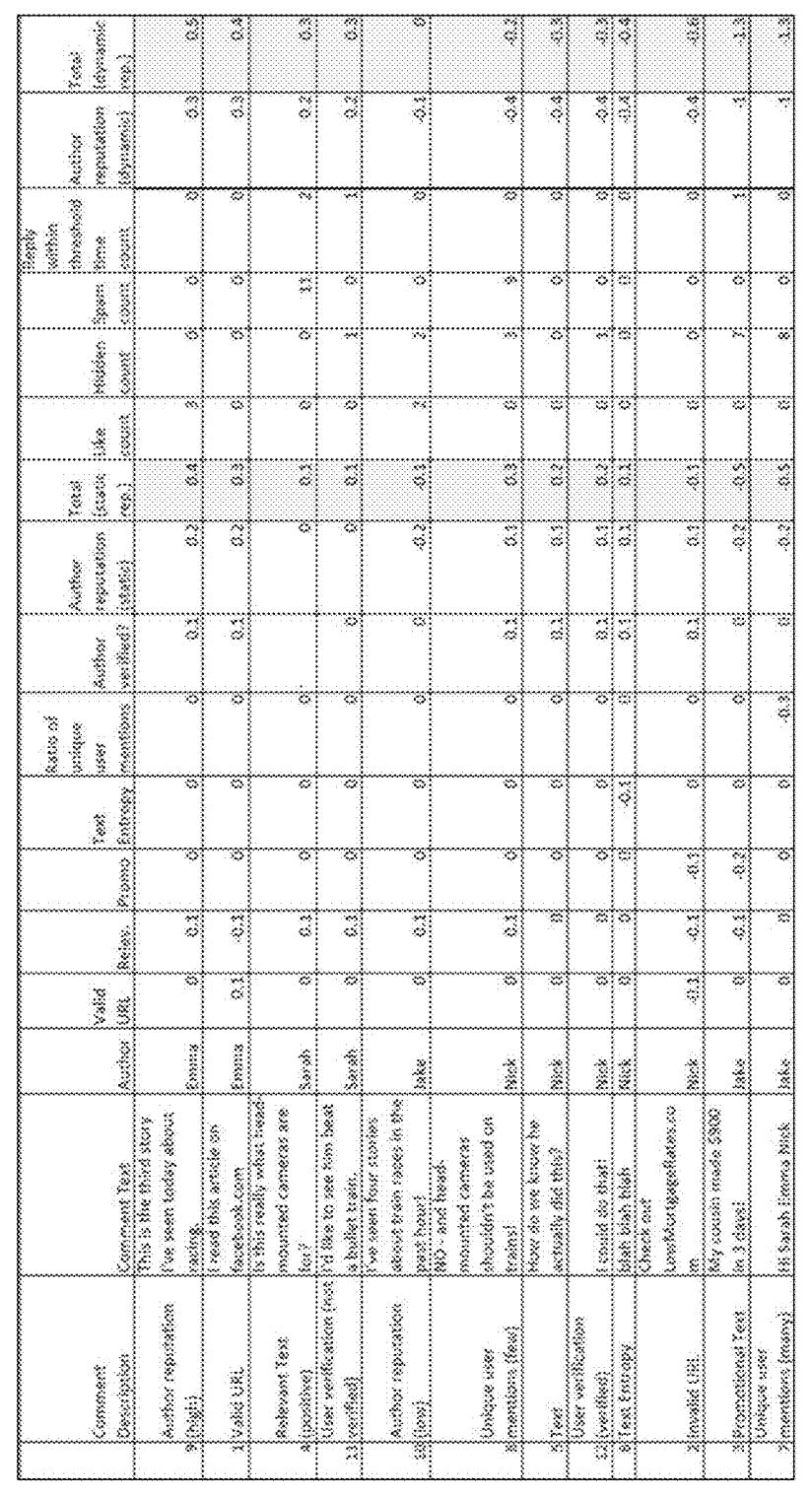

In particular embodiments, a comment that is a response to another "parent" comment may be ranked higher in the ordering than the parent comment according to the scores assigned to each comment. In such cases, users may be surprised to see a response comment appear earlier in the list than its parent. To maintain the thread context of the child comment, a parent comment having a lower score than its child comment may be up-ranked so that it is presented above the child, or the child higher-scoring child comment may be down-ranked so that it is presented below the parent. FIG. 5B illustrates an ordering of the comments 320-352 according to scores based on dynamic author reputations. That is, the comments shown in FIG. 5B are sorted by the "Total (dynamic rep.)" column in descending order. Although this disclosure describes ordering comments in a particular manner, this disclosure contemplates ordering comments in any suitable manner.

In particular embodiments, the social-networking system 160 may select one or more of the comments, each of the selected comments meeting filtering criteria. For example, the social-networking system 160 may present each comment that has a score satisfying a threshold value to the user. The comments may be presented in order according to the determined ordering, e.g., sorted by score, such that the comment having the highest score that is greater than the threshold value is presented as the first comment in the list. Alternatively, instead of selecting comments having a score satisfying a threshold value, the social-networking system 160 may select no more than a second threshold number, e.g., 1, 3, 5, 10, 15, or other desired number, of the comments having the highest scores, and present the selected comments. The selected comments may then be presented in order according to the determined ordering. Although filtering according to particular conditions is described herein, filtering according to other conditions is contemplated. For example, comments having scores less than a threshold may be presented instead of comments having scores greater than a threshold. Alternatively, instead of selecting comments having a score greater than a threshold value, social-networking system 160 may select no more than a second threshold number, e.g., 1, 3, 5, 10, 15, or other desired number, of the comments having the lowest scores, and present the selected comments. The selected comments may then be presented in order according to the determined ordering. Although this disclosure describes filtering comments according to criteria in a particular manner, this disclosure contemplates filtering comments according to any suitable criteria in any suitable manner.

In particular embodiments, the social-networking system 160 may present one or more of the ordered comments to a target user. For example, the comments may be displayed as shown in FIGS. 3A-3C, but in the order shown in FIG. 5A or 5B. In particular embodiments, the social-networking system 160 may exclude one or more of the comments based on filtering criteria. For example, comments having scores below a threshold value, e.g., 0, −0.5, −0.1, or other appropriate value, may be excluded, e.g., not presented to the user.

Figure 6:
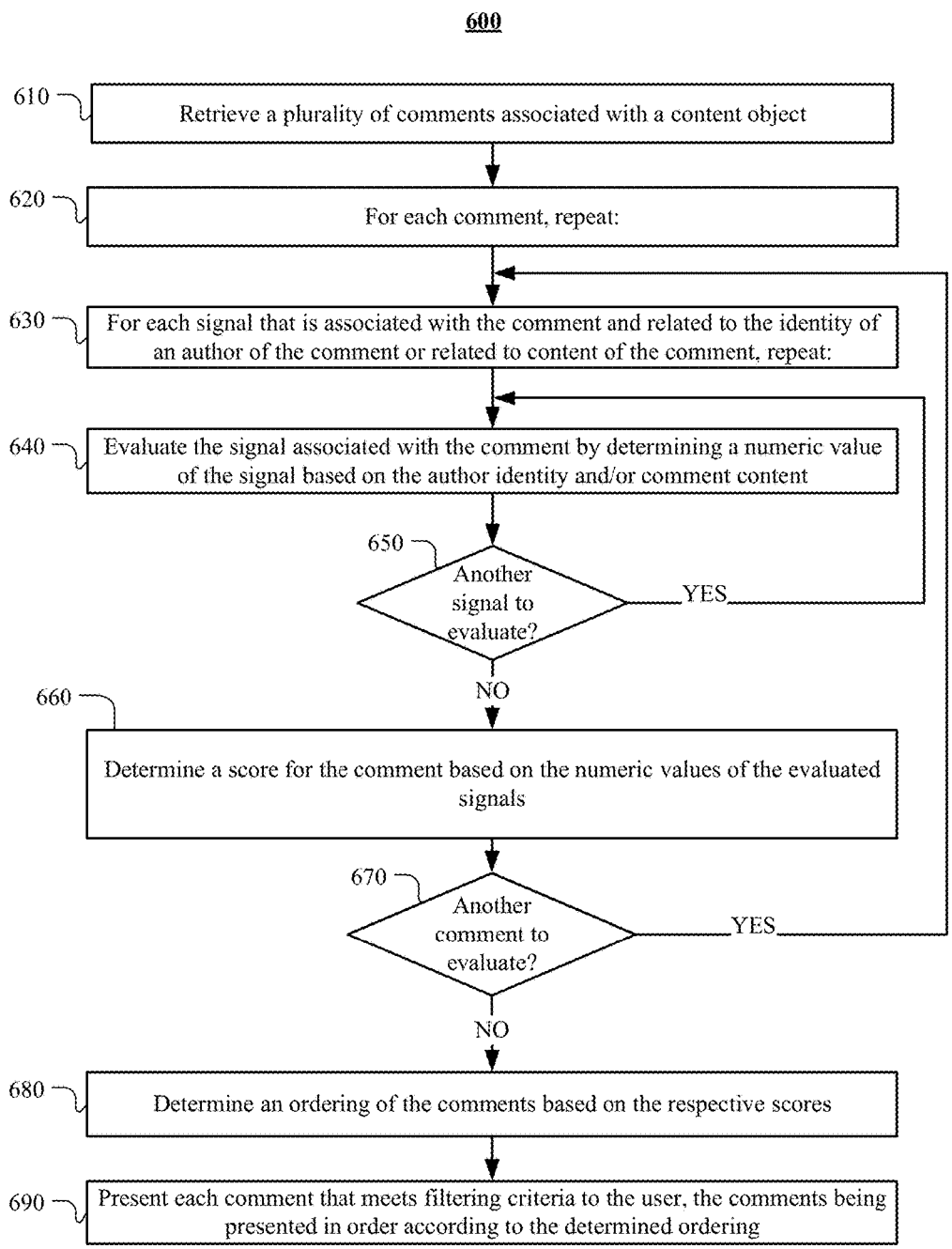
FIG. 6 illustrates an example method for ranking and filtering comments based on the author-related and content-related features of the comments.

FIG. 6 illustrates an example method 600 for ranking and filtering comments based on author-related and content-related features of the comments. The method may begin at step 610, where the social-networking system 160 may retrieve a plurality of comments associated with a content object such as a post. At step 620, the social-networking system 160 may prepare to repeat the subsequent steps (e.g., steps 630 through 660) for each comment. At step 630, the social-networking system 160 may prepare to repeat the subsequent step (e.g., step 640) for each signal that is associated with the comment and related to the identity of an author of the comment and/or related to content of the comment. At step 640, the social-networking system 160 may evaluate the signal associated with the current comment by determining a numeric value of the signal based on the identity of the author of the comment and/or related to content of the comment, and store the determined numeric value in memory for use at step 660. At step 650, the social-networking system 160 may determine whether there is another one of the signals identified at step 630 to evaluate, e.g., another signal that is associated with the current comment and satisfies the conditions specified in step 630. If so, step 640 is executed again for the next signal associated with the current comment. If there is not another signal to evaluate, step 660 is executed. Step 660 determines a score for the comment based on the numeric value(s) of the signal(s) evaluated at step 640. At step 670, the social-networking system 160 may determine whether there is another comment to evaluate, e.g., another comment associated with the content object. If so, step 630 is executed for the next comment. If not, step 680 is executed. At step 680, the social-networking system 160 may determine an ordering of the comments based on the respective scores. For example, step 680 may sort the comments by their scores, as described above with reference to FIGS. 5A and 5B. At step 690, the social-networking system 160 may present each comment that has a score satisfying a threshold value to the user. The comments may be presented in order according to the determined ordering. Alternatively, instead of selecting comments having a score satisfying a threshold value, step 690 may select a threshold number, e.g., 1, 3, 5, 10, 15, or other desired number, of comments, and present the selected comments. To present the comments, the social-networking system 160 may cause the comments to be displayed, e.g., on a mobile device or a web browser located on a client system 130.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for ranking and filtering comments based on the author-related and content-related features of the comments including the particular steps of the method of FIG. 6, this disclosure contemplates any suitable method for ranking and filtering comments based on the author-related and content-related features of the comments including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, comments on social-network pages may be ranked and filtered based on one or more audience interactions with the comment. For example, a score may be determined for each of the comments. The score may be based on one or more signals, the signals being associated with the comment and related to interactions by audience members with the comment. The audience members may be, e.g., social-network users, who may be separate from the target user and the comment author. These audience interactions may include how users in the author's social network or admins have been interacting with the comment, and the author's responses to those interactions.

The terms "up-ranked" and "down-ranked" are used herein to refer to adding a positive signal value to a comment's score or subtracting a signal value from the comment's score, respectively. The magnitude of the quantity that is added or subtracted may depend on the strength of the signal, e.g., how many data points have contributed to the signal value, or how many times an action or condition that causes the signal to be set has occurred. The magnitude may also depend on the importance of the signal to an administrator or other person who configures the comment ranking system. For example, if an interaction by a target user's friend with a comment is found to be a good indication that the target user will like the comment, then a signal that corresponds to presence of a friend interaction with the comment may be set to a relatively large value, e.g., 0.5, when such a friend interaction is identified. Conversely, if friend interactions are a weak but positive indication that the target user will like the comment, then the signal may be sent to a relatively small value, e.g., 0.05 or 0.1. As another example, if friend interactions indicate that the target user will not like the comment, then the signal may be set to a negative value, e.g., 0.1 or 0.2. Changing the magnitude based on the importance or other property of the signal may also be achieved by associating a weight value with the signal, e.g., a weight of 5 to multiply the value 0.1 by 5. In this case, the signal value may be normalized or limited to a maximum of 1.0 so that the values remain in the range −0.1 to 1.0. Thus, the signal value magnitude may be varied based on information that varies for a particular comment, such as the number of friends who liked a specific comment. To change the signal magnitude for all comments, the signal magnitude may be weighted by a weight value associated with the signal. As an example, if the user posts the same comment on many different pages, or consistently posts the same photo, or the user's comments are consistently marked as spam, then the user's comments are down-ranked. In this example, to down-rank the comments, a signal value is set to a negative value, e.g., −0.1, −0.5, or the like.

In particular embodiments, the social-networking system 160 may retrieve a plurality of comments associated with a content object. For example, the comments may have been submitted by users of the social-networking system 160 as responses to a post. The comments may be retrieved by a server 162 from a data store 164 hosted by the social-networking system 160.

In particular embodiments, the social-networking system 160 may determine a score for each of the comments, where the score is based on one or more signals associated with the comment, the signals are related to one or more audience interactions with the comment, and each of the audience interactions comprises an interaction by a respective audience member with the comment. In particular embodiments, each of the audience interactions further comprises one or more responses to the audience interaction by an author of the comment. As an example and not by way of limitation, an audience member may be a user of the social-networking system 160.

In particular embodiments, the one or more signals may be based on existence of an edge between a user node representing the audience member and a user node representing an author of the comment in a social graph on the social-networking system. As an example and not by way of limitation, the audience-related features may include how users in the author's social network, e.g., the author's friends, have been interacting with the comment, and what the author's responses are to those interactions. As another example, comments authored by friends or other social connections of a target user (e.g., the user viewing the comments) may be up-ranked. When a friend of the target user makes a comment, even if the quality is low according to other signals, because the commenter is a friend, the comment still has some value to the target user, and is up-ranked. The ranking of a comment may also be based on how many friends of the comment owner (e.g., author) and/or how many administrators (or moderators) liked the comment.

In particular embodiments, the one or more signals may be further based on a topic referenced in the comment, where the audience member has interacted with another comment that references the topic. A user's friends' comments may be up-ranked based on topics the user has interacted with. For example, if the user and a friend of the user have both interacted with the same topic, e.g., "Trains," then the friend's comments may be up-ranked.

In particular embodiments, the audience member may be an administrator (or moderator). Comments may be ranked based on how administrators interact with comments. Administrators may include moderators. For example, comments made by administrators may be up-ranked, since administrators are likely to make important announcements and/or are likely to have authority and need to be able to communicate important information to other users. The ranking of a comment may be based on how many administrators (or moderators) liked the comment.

In particular embodiments, the one or more signals may be based on detecting that the audience member is an author of the content object or the comment. Ranking may be based on whether the owner (e.g., author) of the post is also the author of the comment. For example, comments made by the owner of the post may be up-ranked because the owner has knowledge of the post content and is therefore more likely to create comments that are relevant to the post. As an example and not by way of limitation, a comment made by an owner may be moved to the top of the comments, e.g., by setting the a signal for owner comments to a special value that causes the post to be moved to top of the comment list. In this way, additional content, corrections, or clarifications may be added to the post, as comments, in a way that is likely to be seen by other users reading the post. In particular embodiments, the one or more signals are based on how many of the one or more comments were authored by an author of the content object. For example, the signal for owner comments may be proportional to the number of comments that were authored by the author of the post.

In particular embodiments, the one or more signals may be based on detecting that the content object and the comment have the same author. Ranking of a comment may be based on responses from the author of the post. If the original author responds to someone, then, orthogonal to the quality of that comment, the interaction causes the comment to be up-ranked.

In particular embodiments, the one or more signals are for a specific audience interaction and may be based on detecting that the audience member follows an author of the comment on the online social network. For example, comments made by users who are followed by the post's author on the online social network may be up-ranked. By following the commenting users, the post's author has indicated that he or she trusts the commenter' views to some extent. As another example, if the audience member who interacts with a comment follows the author of the comment, then the comment may be up-ranked because by choosing to follow the comment author, the audience member has indicated that he or she is likely to self-identify as part of the comment author's page or profile's community. A first user following a second user is a strong indication that the first user wishes to see more of the second user's contents, and the second user's comments on public threads may be up-ranked to the top of the thread (which may be ordered by score) when the thread is presented to the first user. As another example, when a post shows up in a list of trending posts, some authors of comments are not connected to the author of the post, and are not part of the post author's page or profile's community of the author of the post. Comment authors who are not connected to the post author of the post may be likely to leave lower-quality comments than comment authors who are connected to the post author.

In particular embodiments, the one or more signals are for a specific audience interaction and may be based on detecting that an author of the content object follows an author of the comment on the online social network. Ranking may be based on whether the owner (e.g., post author) follows the comment author on the social-networking system. For example, if the owner follows the comment author, then the comment author is likely to be of interest to the owner and therefore to readers of the owner's posts. Accordingly, comments made by authors who are followed by the owner may be up-ranked.

In particular embodiments, the one or more signals may be based on detecting that the audience member has viewed the content object. In particular embodiments, the one or more signals may be further based on an amount of time during which the audience member viewed the content object. Users who have read a post or article will likely create higher-quality content than users who see the post in their feed and do not read the post's content. For example, a user who sees the title or an excerpt of the post and happens to have a strong opinion about a subject related to the post may write a comment that is not directly related to the content of the post. A Viewed by Users signal may represent whether users have viewed the post (e.g., a positive value if so, or 0 if not). As an example and not by way of limitation, a post that is displayed to or interacted with by a user is considered to be viewed by the user. The Viewed by Users signal may be proportional to the number of users who have viewed the post. In particular embodiments, the one or more signals for the specific audience interaction are further based on an amount of time during which the audience member viewed the content object, and the amount of time is measured as between a time at which the tap interaction is received and a time at which the instructions to navigate away from the article are received. The Viewed by Users signal may also be proportional to the time that users have spent viewing the post. This signal may be based on whether the commenter scrolled through the article (which causes the post to be up-ranked) or just tapped on it and then quickly moved on to view something else.

In particular embodiments, the one or more signals are for a specific audience interaction and may be further based on receiving a tap interaction to scroll through the article then receiving instructions to navigate away from the article within a threshold time of the tap interaction. For example, the comment may be down-ranked if the commenter viewed the post for a very short time. The score may be unchanged (e.g., signal value=0) if the commenter spent at least a threshold amount of time reading the post and/or scrolled through the post. As an example and not by way of limitation, this information about whether users viewed or interacted with a post may be measured based on link navigation in an application or web browser.

In particular embodiments, the one or more signals may be based on a language in which the comment is written. In particular embodiments, the comment is excluded when the language in which the comment is written is not associated with the profile for the target user and the language in which the content is written differs from the language in which the comment is written. Ranking may be based on whether the comment was liked predominately by people with a different primary language from that of the source post. If so, the comment may be down-ranked, because it is unlikely to be understood by most readers of the post, or may be spam or otherwise irrelevant to the post. In particular embodiments, the one or more signals may be further based on detecting that the language in which the comment is written is associated with a profile for the target user or detecting that a language in which the content object is written is associated with a profile for the target user. As an example, if a comment is in a language not spoken or understood by the user (e.g., as determined by the user's profile, or by inference based on observation of the user's language interactions), then the comment may be filtered from user's view so that it is not seen by the user, unless the comment is posted by another user who the user already follows.

In particular embodiments, the one or more signals may be based on demographic information associated with the audience member. Ranking may be based on demographic information about users. As an example, nationality information may be used to rank posts or comments. The text of posts and comments may be search for a country name, such as a post stating "Come to Turkey." Such a post containing the name of a country may be down-ranked if it is liked or otherwise interacted with by users who are primarily from Turkey, because those users may have a nationalistic bias. Images of national flags and meme photos related to nationalities may also be down-ranked. As another example, if a post or comment is only or primarily liked by users who are primarily from a single country, and the comment is short or has signals indicating low grammar quality, then the post may be nationalistic and may consequently be down-ranked. The term "primarily" as used herein may mean, e.g., 75% or more, 85% or more, 90% or more, 95% or more, or another percentage close to or equal to 100%. As still another example, if a user posts a Brazilian flag, and most of the people who like the flag posting are from Brazil then the content is disproportionately interacted with by people from a country related to the post. Thus, the effect of the interaction with a post or comment related to a country can be discounted or modulated by down-ranking comments made by users who are from that country.

Figure 7:
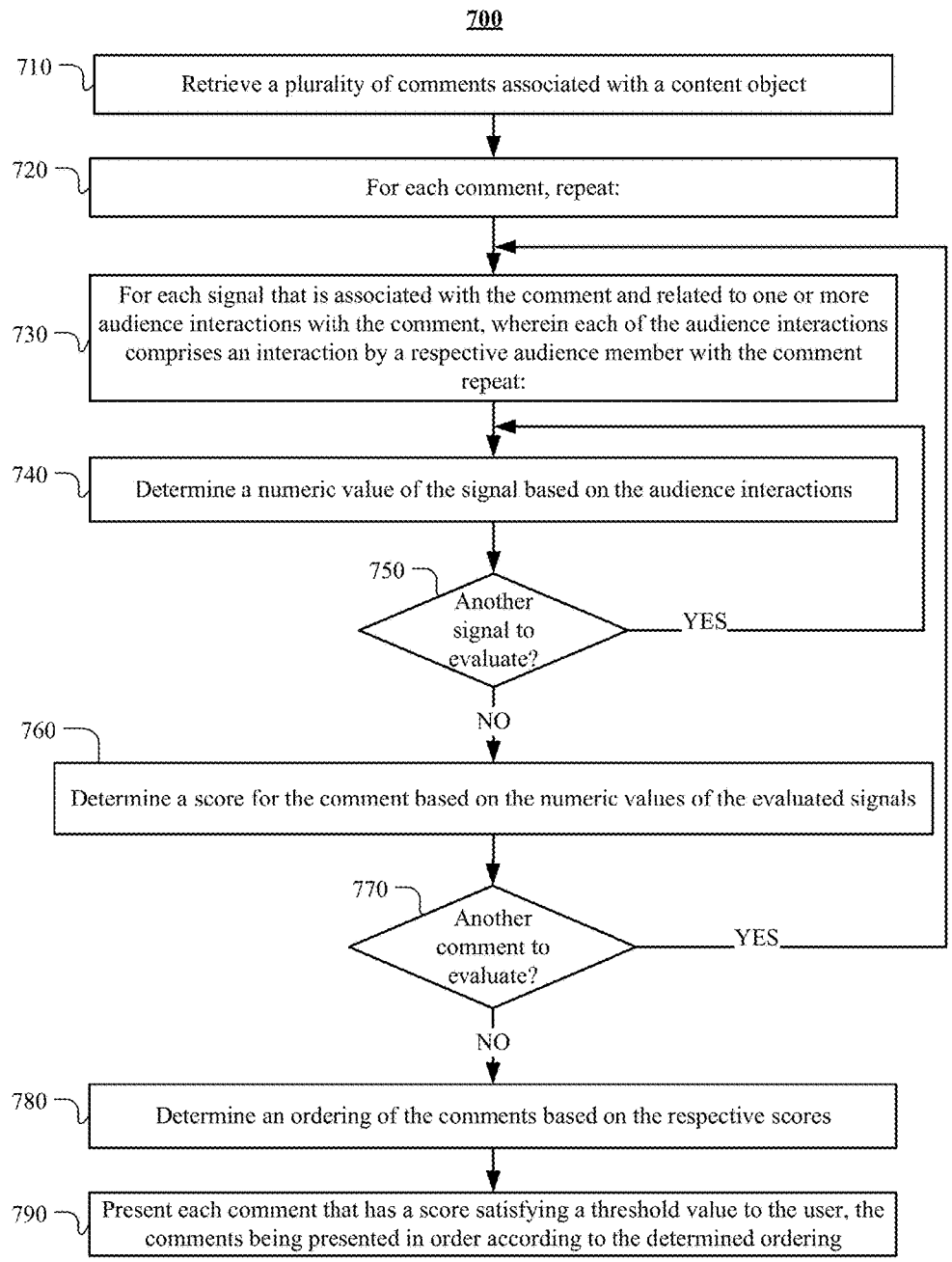
FIG. 7 illustrates an example method for ranking and filtering comments based on audience-related features of the comments.

FIG. 7 illustrates an example method 700 for ranking and filtering comments based on the audience-related features. The method may begin at step 710, where the social-networking system 170 may retrieve a plurality of comments associated with a content object such as a post in a social-networking system. At step 720, the social-networking system 170 may prepare to repeat the subsequent steps (e.g., steps 730 through 760) for each comment. At step 730, the social-networking system 160 may prepare to repeat the subsequent step (e.g., step 740) for each signal that is associated with the comment and related to one or more audience interactions with the comment. Each of the audience interactions may be an interaction by a respective audience member with the comment. At step 740, the social-networking system 160 may evaluate the signal associated with the current comment by determining a numeric value of the signal based on the audience interactions with the comment, and store the determined numeric value in memory for use at step 760. At step 750, the social-networking system 160 may determine whether there is another one of the signals identified at step 730 to evaluate, e.g., another signal that is associated with the current comment and satisfies the conditions specified at step 730. If so, step 740 is executed again for the next signal that is associated with the current comment and satisfies the conditions of step 730. If there is not another signal to evaluate, step 760 is executed. Step 760 determines a score for the comment based on the numeric value(s) of the signal(s) evaluated at step 740. At step 770, the social-networking system 160 may determine whether there is another comment to evaluate, e.g., another comment associated with the content object. If so, step 730 is executed for the next comment. If not, step 780 is executed. At step 780, the social-networking system 160 may determine an ordering of the comments based on the respective scores. For example, step 780 may sort the comments by their scores, as described above with reference to FIGS. 5A and 5B. At step 790, the social-networking system 160 may present each comment that has a score satisfying a threshold value to the user. The comments may be presented in order according to the determined ordering.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for ranking and filtering comments based on audience-related features of the comments including the particular steps of the method of FIG. 7, this disclosure contemplates any suitable method for ranking and filtering comments based on audience-related features of the comments including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, comments may be ranked and filtered for presentation to target user based on a history of user interactions with the target user's newsfeed. User interactions with a newsfeed may include a user liking, posting, or sharing a comment on the target user's newsfeed. Other possible interactions include a user marking a comment as disliked, spam, or hidden. A user friending, unfriending, following, or unfollowing another user may also be considered interactions with a newsfeed. Each interaction that relates to a comment may be evaluated to determine a numeric signal value, e.g., a positive or negative value to be added to the comment's ranking score. The sign and magnitude of the value may be determined by a signal that is selected based on the type of interaction. The signal may specify a static value or a dynamic rule that can generate a value based on the specific interaction. For example, a user liking a comment may statically set the signal value to a positive value, e.g., 0.1. A user interaction of marking a comment as spam may statically set the signal value to a negative value, e.g., −0.2. The target user friending another user (e.g., as a result of or in relation to a newsfeed interaction such as viewing or liking a comment) may dynamically set the signal value to 0.1 if the other user is an administrator, or to a value inversely proportional to the degree of separation between the target user and the other user in the social graph (e.g., 0.9 for a first-degree friend, 0.6 for a third-degree friend, and so on). The signal values determined based on feed interactions related to a comment may be added to the comment's ranking score to influence the position of the comment in the list produced by the ranking and filtering operations.

Figure 8:
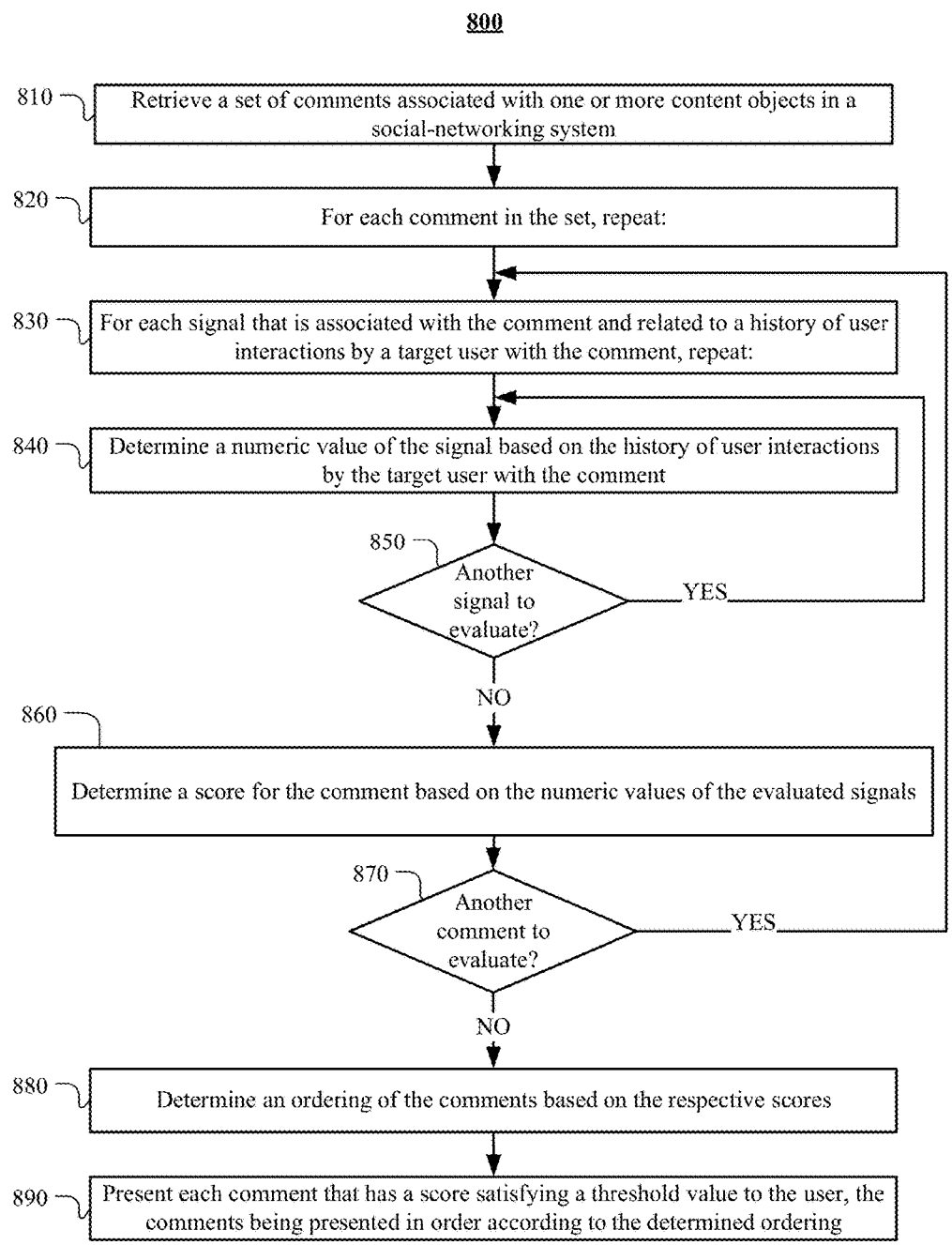
FIG. 8 illustrates an example method for ranking and filtering comments based on interactions of the user viewing the comments with one or more social networking feeds.

FIG. 8 illustrates an example method for ranking and filtering comments based on interactions of the user viewing the comments with one or more social networking feeds. The method may begin at step 810, where the social-networking system 160 may retrieve a set of comments associated with a content object such as a post. At step 820, the social-networking system 160 may prepare to repeat the subsequent steps (e.g., steps 830 through 860) for each comment in the set. At step 830, the social-networking system 160 may prepare to repeat the subsequent step (e.g., step 840) for each signal that is associated with the comment and related to a history of user interactions by a target user with the comment. Step 830 may identify each signal as described below with reference to FIG. 11. At step 840, the social-networking system 160 may evaluate the signal associated with the current comment by determining a numeric value of the signal based on the history of user interactions by the target user with the comment, as described below with reference to FIG. 11. Step 840 may also store the determined numeric value in memory for use at step 860. At step 850, the social-networking system 160 may determine whether there is another one of the signals identified at step 830 to evaluate, e.g., another signal that is associated with the current comment and satisfies the conditions specified in step 830. If so, step 840 is executed again for the next signal associated with the current comment. If there is not another signal to evaluate, step 860 is executed. Step 860 determines a score for the comment based on the numeric value(s) of the signal(s) evaluated at step 840. At step 870, the social-networking system 160 may determine whether there is another comment to evaluate, e.g., another comment in the set. If so, step 830 is executed for the next comment. If not, step 880 is executed. At step 880, the social-networking system 160 may determine an ordering of the comments based on the respective scores. For example, step 880 may sort the comments by their scores, as described above with reference to FIGS. 5A and 5B. At step 890, the social-networking system 160 may present each comment that has a score satisfying a threshold value to the user. The comments may be presented in order according to the determined ordering.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for ranking and filtering comments based on the author-related and content-related features of the comments including the particular steps of the method of FIG. 8, this disclosure contemplates any suitable method for ranking and filtering comments based on the author-related and content-related features of the comments including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 11:
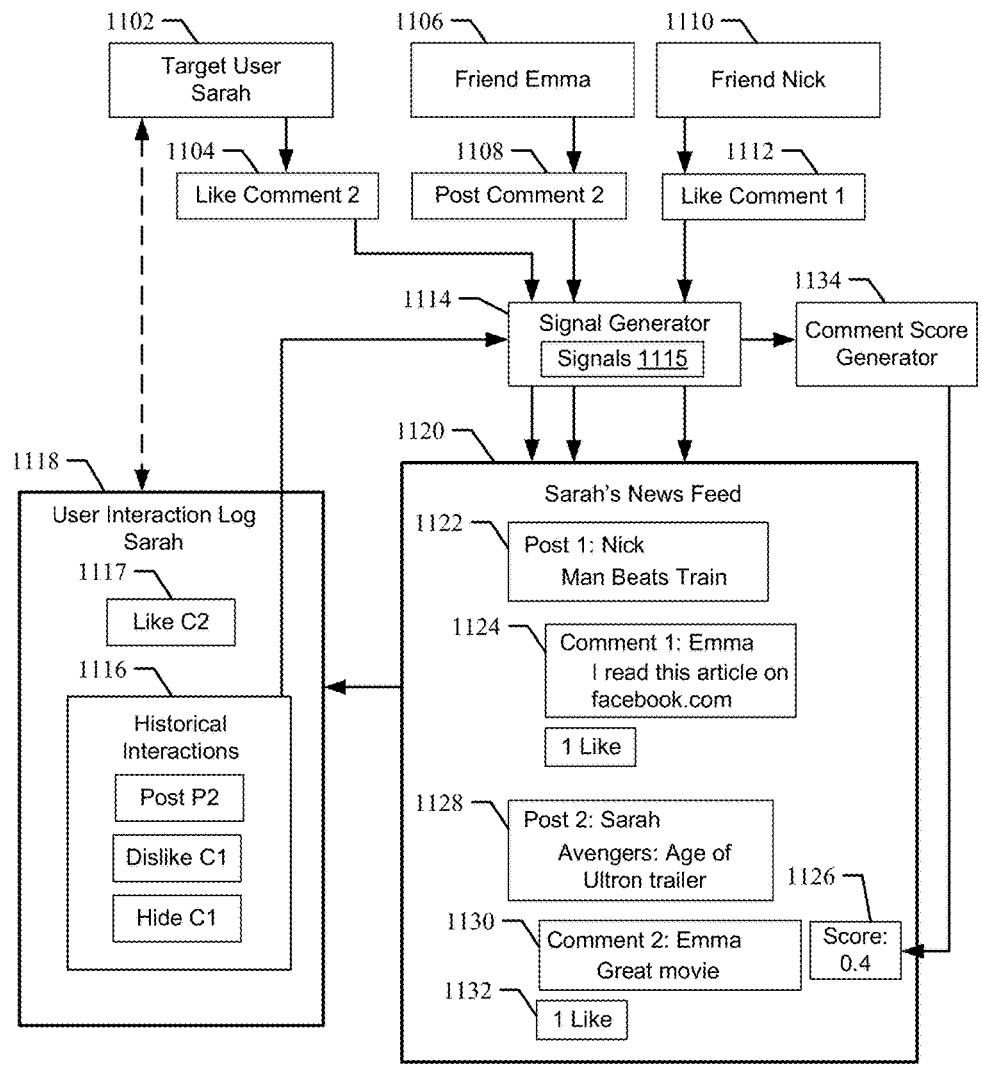
FIG. 11 illustrates an example of interaction with a news feed.

FIG. 11 illustrates an example of user interactions with a newsfeed 1120. The newsfeed 1120 may be a list of content objects, such as posts and their associated comments. The newsfeed 1120 is associated with a target user 1102 ("Sarah"), who may create and view posts on the newsfeed 1120. A user interface that represents the newsfeed 1120 may be presented to the target user 1102, e.g., in a web browser or application executing on client system 130. In particular embodiments, the newsfeed 1120 may present posts 1122, 1128 and respective comments 1124, 1130 replying to the posts. The posts and comments presented on a user's news feed 1120 may have been authored by the target user or by other users (subject to permission restrictions associated with the newsfeed 1120).

In the newsfeed 1120, a first post 1122 has an author "Nick" and text content "Man Beats Train." A first comment 1124 replying to the first post 1122 has an author "Emma" and text "I read this article on uknews.com." A second post 1128 has an author "Sarah" and text content "Avengers: Age of Ultron trailer." A second comment 1130 replying to the first post 1122 has an author "Emma" and text "I read this article on uknews.com." The user interface that represents the newsfeed 1120 may be responsive to user input such as commands that enable the target user 1102 to post, like, dislike, share, or hide a comment, create a new post, friend, follow, unfriend, and unfollow other users, and so on. Further details of the newsfeed 1120 are provided elsewhere herein. The newsfeed 1120 may present other content in addition to or instead of the posts and comments shown.

In particular embodiments, the target user 1102 ("Sarah") may interact with the social-networking system 160, e.g., by "liking" a comment 1124 that is displayed on the newsfeed 1120. Such an interaction may be represented by a newsfeed interaction 1104, which may be sent from the client system 130 of the target user 1102 to the social-networking system 160. The social-networking system 160 may perform the newsfeed interaction 1104, e.g., by incrementing a "liked" counter associated with the comment 1124. The social-networking system 160 may also present a user interface element 1122 (e.g., "1 Like") representing the newsfeed interaction 1104 in the newsfeed 1120.

In particular embodiments, the social-networking system 106 may store a record of each newsfeed interaction 1104 in a user-interaction log 1118 as a logged interaction 1116. That is, each logged interaction 1116 may reference or include a newsfeed interaction, 1104 e.g., a like, post, or the like. The logged interaction 1116 may include other types of interactions between users and the social-networking system as well, such as responses from the social-networking system 160 to the user actions. As an example and not by way of limitation, there may be multiple user-interaction logs 1118, each specific to a particular target user 1102 (e.g., as the interaction log 1118 is specific to the user 1102 ("Sarah") in the example of FIG. 11). Alternatively, a single user-interaction log 1118 may store logged interactions for multiple users, with each logged interaction identifying a user associated with the logged interaction.

As an example and not by way of limitation, the social-networking system 160 may generate a logged interaction "Like C2" 1117 for Sarah in response to Sarah's "Like Comment 2" action 1104 indicating that Sara likes the second comment 1130. That is, the "Like C2" 1117 logged interaction represents the "Like Comment2" newsfeed interaction in which Sarah liked the second comment 1130 ("Great movie"). The social-networking system 160 may store the logged interaction "Like C2" 1117 in the user interaction log 1118. The social-networking system 160 has also generated and stored other logged interactions in the interaction log 1118. These other logged interactions are referred to herein as historical interactions 1116. The historical interactions 1116 include a "Post P2" logged interaction in the user interaction log 1118 indicating that Sarah posted the second post 1128 ("Avengers: Age of Ultron trailer"), a "Dislike C1" logged interaction indicating that Sarah disliked the first comment 1124 ("I read this article . . . "), and a "Hide C1" logged interaction indicating that Sarah hid the first comment 1124. FIG. 11 shows additional newsfeed interactions that have not been stored in the interaction log 118, including a "Post Comment 2" newsfeed interaction 1108 received from the newsfeed 1120. The interaction log 1118 may be a file, database, in-memory data structure, or other form of storage in which the interactions are stored. The interaction log 1118 and newsfeed 1120 may be stored in the data store 164, memory 1204, and/or storage 1206 of a server 162 of the social-networking system 160.

In particular embodiments, the social-networking system 160 may retrieve a set of comments associated with one or more content objects. The comments may have been submitted by users of the social-networking system 160, e.g., as responses to a post. The comments may be stored in and retrieved from the data store 164 by the server 162 of the social-networking system 160.

In particular embodiments, the social-networking system 160 may determine a score for each of the comments for a selected one of the content objects, where the score for each of the comments is based on one or more signals associated with the comment, and the signals are related to a history of user interactions by a target user with one or more of the comments in the set. In particular embodiments, a signal generator 1114 may generate signals 1115 based on newsfeed interactions 1102, 1106, 1110, logged interactions 1116, or on a combination thereof. Each of the signals 1115 has a numeric value that contributes to comment ranking scores, as described in further detail with reference to FIG. 4A. In the example shown in FIG. 4A, the "Post P2", "Dislike C1", and "Hide C1" logged interactions 1116 are historical interactions that occurred prior to the "Like Comment2" newsfeed interaction 1104, which is a "current" interaction, e.g., the most recent interaction. The "Like Comment2" newsfeed interaction 1104 has been stored in the interaction log 1118 as a current interaction 1117 ("Like C2"). The current interaction 1117 may become a historical interaction 1116 when the next interaction occurs and is stored in the log 1118. Signal generator 1114 may generate the signals 1115 based on one or more of the historical interactions 1116.

In particular embodiments, the user interactions 1104 by the target user 1102 with one of the comments 1124, 1130 may include liking or commenting on the comment or liking or commenting on the content object 1122, 1128 associated with the respective comment. A comment score generator 1134 may generate comment scores, such as a score 1126, based on the signals 1115. The comment scores may be used to rank the comments 1104, 1104, 1112 (and/or posts 1122, 1128). The score 1126 may be based on a signal (e.g., a Comment Liked signal) that the signal generator 1114 generates when it processes the "Like Comment2" newsfeed interaction 1112. For example, the signal generator 1114 generates a comment score of 0.4 for the Comment Liked signal in the example of FIG. 11. As described above, the "Like Comment1" newsfeed interaction 1112 may also cause the social-networking system 160 to store the current interaction 1176 ("Like C2") in the user-interaction log 1118. Thus, each newsfeed interaction 1104 may cause one or more corresponding signals 1115 to be generated, and may also cause a corresponding logged interaction to be stored in the user interaction log 1118.

The newsfeed interactions between users 1102, 1106, and 1110 and the newsfeed 1120 may include liking, commenting on, or sharing a post or comment, disliking, hiding, or marking as spam a post or comment, and friending, following, unfriending, or unfollowing a user (e.g. a user whose name is shown in the newsfeed 1120). As described above, the signal generator 1114 may generate signals based on the interactions, and the signals may be converted to scores on the posts or comments associated with the interactions. The interactions may be divided into positive, neutral, and negative interactions. Positive interactions, such as liking or sharing a post, or friending or following a user, may be converted to positive scores, e.g., 0.1, 0.4 or the like. Neutral interactions, such as commenting on or replying to a post, may be converted to a score of 0, since a comment may be have a positive or negative meaning. Negative interactions, such as disliking, hiding, or marking as spam a post or comment, or defriending or unfollowing a user, may be converted to negative scores, e.g., −0.1, −0.4, or the like.

In particular embodiments, a static value or dynamic rule may be associated with each of the signals 1115 to determine the sign and magnitude of the signal value 1126 generated by a comment score generator 1134. For example, an interaction in which a user likes a comment may statically set the signal value to 0.1. An interaction in which the target user friends another user (e.g., as a result of or in relation to a newsfeed interaction such as viewing or liking a comment) may dynamically set the signal value to 0.1 if the other user is an administrator, or to a value inversely proportional to the degree of separation between the target user and the other user in the social graph (e.g., 0.9 for a first-degree friend, 0.6 for a third-degree friend, and so on).

In particular embodiments, the user interactions by the target user with one of the comments may include friending another user who is related to the content object associated with the comment or to the comment. For example, the target user Sarah 1102 may have friended user Nick 1110, who posted post 1122 ("Man Beats Train"), and a record of the friending interaction may be stored in the user interaction log 1118. Since Nick posted the post 1122, Nick is related to the post 1122. The comment 1124 for the post 1122 may be scored based on one or more signals associated with the comment 1124, where the signals are related to the history of user interactions (e.g., the interaction log 1118). As an example and not by way of limitation, a signal named "Author is Friend" may be provided to detect this situation, e.g., that the author of a content object associated with a comment is a friend of the target user (or an administrator).

The signal generator 1114 may receive the friended interaction between the target user and Nick from the interaction log 1118, and match the interaction with the Author Is Friend signal. The "Author is Friend" signal may have a rule that determines the value of the signal, e.g., as 0.2 if the author is an administrator, or as a value inversely proportional to the degree of separation between the target user and the author in the social graph (e.g., 0.9 for a first-degree friend, 0.6 for a third-degree friend, and so on). As a result, the ranking of the comment authored by the friend may be increased by an amount inversely proportional to the degree-of-separation between the friend and the target user.

In particular embodiments, the user interactions by the target user with one of the comments may include disliking, hiding, or unfriending another user related to the content object associated with the comment or to the comment. These interactions may be processed similarly to the friending interaction described above, except the score is set to a negative value for disliking, hiding, or unfriending another user. As an example, different negative values may be used for each type of negative interaction, e.g., −0.3 for disliking, −0.2 for hiding, or −0.1 for unfriending. Other values may be chosen as desired, or based on A/B testing that determines the effectiveness of different scores.

In particular embodiments, the user interactions by the target user with one of the comments may include disliking or hiding the comment. For example, a signal named Comment Disliked may be used by the signal generator 1114 to detect that one of the comments in the target user's news feed 1120 has been disliked (e.g., marked as not liked) by a friend of the target user or by an administrator (or, alternatively, by any user). A disliked interaction may be stored in the interaction log 1118 and received by the signal generator 1114. The signal generator 1114 may match the disliked interaction with the "Comment Disliked" signal, and a score may be determined according to a rule specified by the signal. For example, the score may be set to −0.2, so that the total score is reduced by 0.2 for each disliked interaction in the log 1118 (until a minimum value of −1.0 is reached). A "Comment Hidden" signal may be defined to handle hidden comment interactions similarly, reducing the total score by, e.g., 0.1 for each time the comment is hidden by a friend of the target user or an administrator (or, alternatively, by any user).

In particular embodiments, the one or more content objects may be presented in a newsfeed for the target user. For example, a post 1122, "Man Beats Train" and a post 1128 "Avengers: Age of Ultron trailer" are presented in the target user's news feed 1120 of FIG. 11.

In particular embodiments, other users 1106 ("Emma") and 1110 ("Nick") may interact with the target user's newsfeed 1120. For example, a post by Nick appears on Sarah's newsfeed, and Emma comments on the post. These interactions may appear on the target user Sarah's newsfeed 1120 because the target user is following Nick or Emma, or because Nick or Emma specifically directs interactions to Sarah's newsfeed. As an example and not by way of limitation, the posts and comments from another user on the target user's news feed 1120 may be created/published on the other user's news feed, and may then be displayed by the social-networking system 160 on the target user's news feed 1120 because the target user follows the other user, or because the other user posts the posts or comments on the target user's newsfeed 1120.

In particular embodiments, the signals 1115 may be based on a history of user interactions 1118 by one or more other users 1106, 1110 with one or more of the comments 1122, 1128 in the set, where the other users 1106, 1110 are connected to the target user 1102 in the social-networking system. The other users 1106, 1110 may be friends of the target user 1102 or administrators in the social-networking system 160. In particular embodiments, the one or more signals may be based on likes of the comment 1124 by one or more friends of the target user. For example, interactions 1108 by other users 1106 with the target user's newsfeed 1120 may be stored in the target user's interaction log 1118, in which case each of the interactions stored in the log 1118 may be associated with the user 1106 who performed the interaction 1108. Alternatively, there may be separate user interaction logs for each user, and the signal generator 1114 may retrieve historical interactions for each interaction 1108 with the newsfeed 1120 from the interaction log for the user 1106 associated with the interaction 1108. Interactions 1108 by other users 1106 with comments 1122, 1128 in the set may include any of the positive, neutral, or negative interactions described above, and signals may be generated for the interactions by other users based on their interactions 1108 as described above for interactions by the target user. As an example and not by way of limitation, comments made by friends of the target user may be moved to the top of the list of comments, since the target user is likely to be interested in comments by friends regardless of the content of the comments.

In particular embodiments, the signals may be based on a topic associated with the comment, where the topic is further associated with one or more stories previously viewed by the target user. For example, suppose that a user posts a comment referencing a particular city and interactions happening in that city in a conversation thread. For most users, comments referencing the city would not be of particular interest, and should not be ranked highly in the thread. However, if a user has been reading stories, posts, or comments about that city in their newsfeed, then comments referencing the city may be up-ranked in the thread, e.g., by receiving a relatively high score such as 0.5, 0.75, or the like. A signal named "Topic Match" may identify topics in comments and posts, e.g., using a topic tagger based on a machine-learning algorithm. If a particular topic is found in multiple posts or comments in a user's newsfeed, then the comments (and/or posts) containing the topic may be up-ranked by receiving a relatively high score. The score may be proportional to the number of posts and/or comments in which the topic occurs. If the target user has visited web pages, articles, or other posts, or there is otherwise an indication that the target user has read the posts and/or comments in which the topic appears, then the score may be increased by an additional factor, e.g., by adding 0.2, because of the additional certainty that the user is interested in the topic.

In particular embodiments, the ranking of comments in the target user's feed may be based on interactions by friends of the target user with the target user's feed or with other feeds. For example, the signals may up-rank comments made by a user's friends or other social connections. When a friend makes a comment, even if the quality is low according to other features, because the commenter is a friend, the comment still has some value to the user, and is up-ranked. For example, commenting by referencing a particular city and interactions happening in that city. In the aggregate view, for most people, comments referencing the city would not ordinarily be highly-ranked in the thread. However, if a user has been reading stories about that city in their feed, then based on the user's feed interaction history, comments referencing that city are up-ranked in the thread.

In particular embodiments, the Reputation signal may determine a reputation value based on newsfeed interactions. The Reputation signal rules may involve searching a comment author's history of interactions. If the user's history of interactions indicates that the user posts the same comment on multiple different pages, or consistently posts the same photo on different pages, or if the user's comments are consistently marked as spam, then the user's reputation score may be set to a negative value to down-rank the user's comments. The negative score may be proportional to the number of different pages on which the same comment or photo is posted, and/or to the number or percentage of the user's comments that are marked as spam according to the user's interaction log.

In particular embodiments, a labeling technique may be used to identify one or more labels that characterize the content of a comment, and to perform comment ranking and filtering based on the identified labels. The labeling technique may use a comment classifier that identifies one or more labels under which the comment may be classified, such as Anecdotal, Eloquent, Descriptive, Promotional, and others. For example, a comment may be labeled promotional if it contains content deemed promotional, e.g., "Like me", "Follow me", etc. A comment may be labeled Eloquent if it contains good grammar. The ranking of comments may be based on ranking scores associated with each comment, and a comment's ranking score may be a sum of the signal values that are based on the comment. Each of the labels identified for a comment may be mapped to a positive or negative signal value. Labels that denote positive qualities, such as the Eloquent and Descriptive labels, are mapped to positive signal values that contribute to raising the comment's ranking score. Labels that denote negative qualities, such as the Promotional label, are mapped to negative signal values that contribute to lowering the comment's ranking score. Thus the signal value(s) used to score a comment may be based on the label(s) identified for the comment, and on other factors such as a confidence value associated with each label by the comment classifier. The sign and magnitude of the value may be determined by the label, and may be determined by a static value or a dynamic rule associated with the label.

Figure 9:
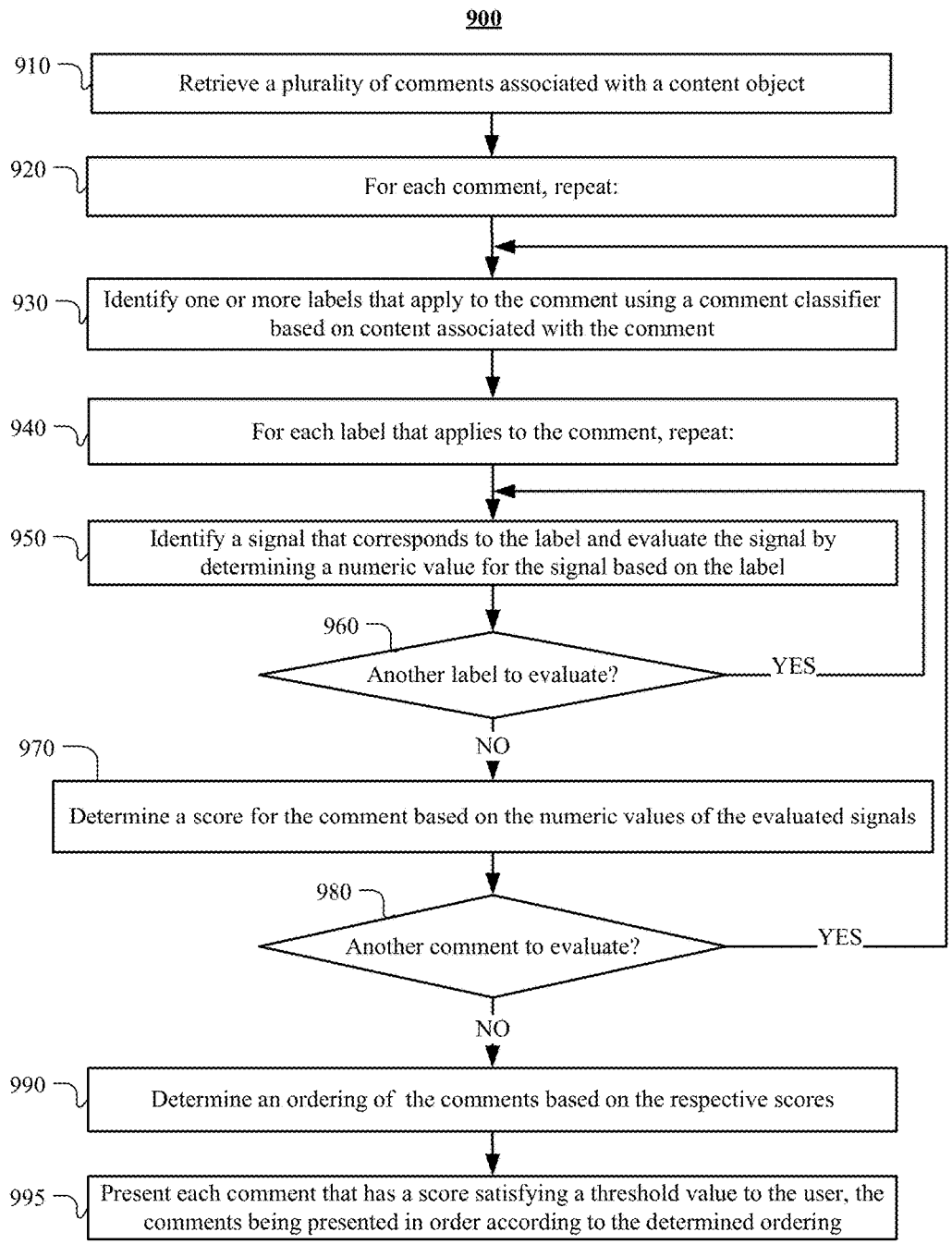
FIG. 9 illustrates an example method for ranking and filtering comments based on labelling of the comments.

FIG. 9 illustrates an example method for ranking and filtering comments based on comment labelling. The method may begin at step 910, where the social-networking system 160 may retrieve a plurality of comments associated with a content object such as a post. At step 920, the social-networking system 160 may prepare to repeat the subsequent steps (e.g., steps 930 through 960) for each comment. Step 930 may identify one or more labels that apply to the comment using a comment classifier based on content associated with the comment, as described below with reference to FIG. 12. At step 940, the social-networking system 160 may prepare to repeat the subsequent step (e.g., step 950) for each label that applies to the comment. At step 950, the social-networking system 160 may identify a signal that corresponds to the label and evaluate the signal by determining a numeric value for the signal based on the label, as described below with reference to FIG. 12. Step 950 may also store the determined numeric value in memory for use at step 970. At step 960, the social-networking system 160 may determine whether there is another one of the labels identified at step 930 to evaluate. If so, step 950 is executed again for the next label associated with the current comment. If there is not another label to evaluate, step 970 is executed. Step 970 determines a score for the comment based on the numeric value(s) of the signal(s) evaluated at step 950. At step 980, the social-networking system 160 may determine whether there is another comment to evaluate, e.g., another comment in the set. If so, step 930 is executed for the next comment. If not, step 990 is executed. At step 990, the social-networking system 160 may determine an ordering of the comments based on the respective scores. For example, step 990 may sort the comments by their scores, as described above with reference to FIGS. 5A and 5B. At step 995, the social-networking system 160 may present each comment that has a score satisfying a threshold value to the user. The comments may be presented in order according to the determined ordering.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for ranking and filtering comments based on the author-related and content-related features of the comments including the particular steps of the method of FIG. 9, this disclosure contemplates any suitable method for ranking and filtering comments based on the author-related and content-related features of the comments including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

In particular embodiments, the social-networking system 160 may retrieve a plurality of comments associated with a content object. For example, the comments may have been submitted by users of the social-networking system 160 as responses to a post. The comments may be retrieved by a server 162 from a data store 164 hosted by the social-networking system 160.

Figure 12:
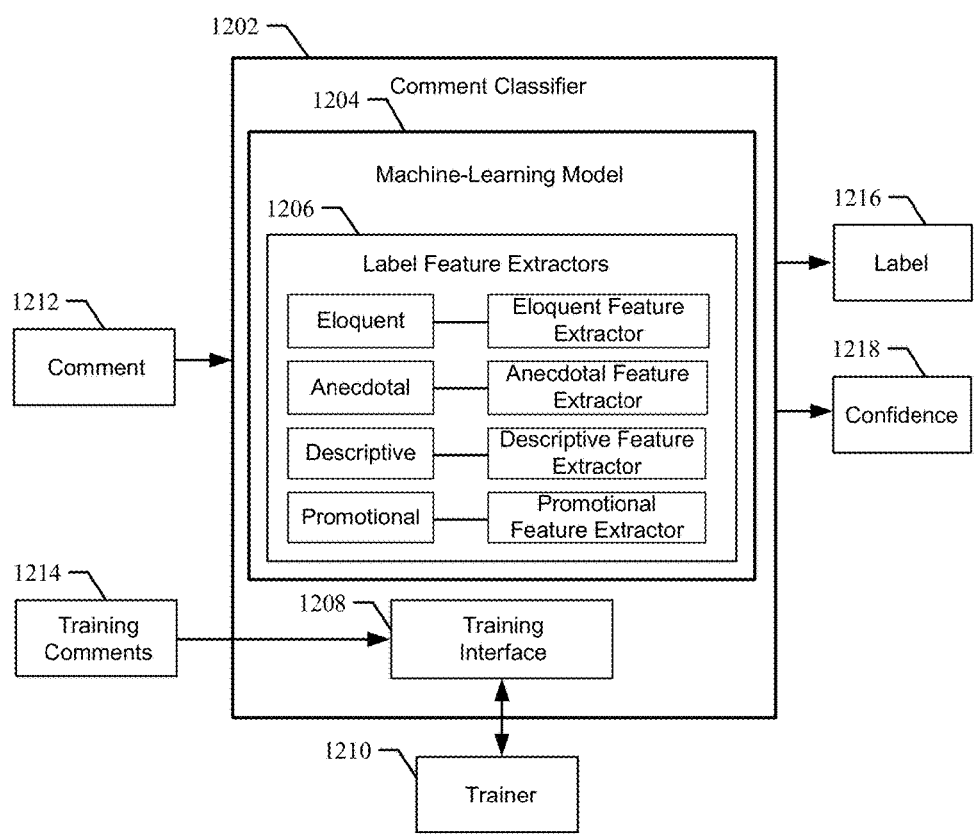
FIG. 12 illustrates an example comment classifier.

In particular embodiments, the social-networking system 160 may determine one or more labels for each of the comments, where the labels for each comment are determined by a text classifier based on content associated with the comment. In particular embodiments, the social-networking system 160 may determine one or more labels for each of the comments by applying a classifier algorithm to each comment to determine the one or more labels, where the classifier algorithm is trained to identify the one or more labels. FIG. 12 illustrates an example comment classifier 1202. The comment classifier 1202 may receive a comment 1212 and identify one or more labels 1216 under which the comment 1212 may be classified with confidence 1218. The comment classifier 1202 may be implemented in computer program code that executes on a computer system or the like, e.g., on the server 162. The comment classifier 1202 may include a machine-learning model 1204 to identify the labels 1216 that correspond to the comment 1212 according to criteria determined from training comments 1214, which may be associated with labels for training the machine-learning model 1204.

In particular embodiments, the machine-learning model uses label feature extractors 1206 associated with each label that define how to extract features from the comment 1212 that can be used to determine whether the label applies to the comment 1212. The feature extractors 1206 may include a feature extractor specific to each label, e.g., an Eloquent Feature Extractor for the Eloquent label, and so on for the Anecdotal, Descriptive, and Promotional labels. Additional labels may be recognized by adding additional feature extractors. The feature extractors 1206 may determine features such as grammar quality (e.g., for the eloquent label), presence of particular types of words (e.g., for the anecdotal label), and so on from the comment 1212 as appropriate to determine whether the label applies to the comment. Prior to using the comment classifier 1202 to identify labels 1216, the classifier 1202 may be trained using manual labeling by a trainer 1210, e.g., a human user who can determine whether particular labels apply to particular comments. The classifier 1202 includes a training interface 1208, which receives the training comments 1214 (which may include correct labels).

In particular embodiments, the training interface 1208 may train the machine-learning model 1204 using the training comments 1214, and may present questions to the trainer 1210, e.g., by making guesses as to which labels apply to which comments, to determine the accuracy of the guesses. The trainer 1210 may make judgments as to what qualifies as relevant, eloquent, etc., and so on based on a set of guidelines, and provides answers to the questions, e.g., yes/no answers or scores in the range 1-5 that rate the quality of the guesses. The training interface 1208 further trains the machine-learning model 1204 based on the trainer's answers. Once the machine-learning model 1204 has been trained, it may be supplied with a comment 1212 for which a ranking is being determined, and predicts one or more labels 1216 that apply to the comment 1212 with confidence 1218. The confidence 1218 may be, e.g., a floating-point value in the range 0 . . . 1, or a number in the range 1 . . . 5, or the like.

To determine whether the eloquent label applies to the comment 1212, the eloquent feature extractor (or, alternatively, a labeling process separate from the comment classifier 1202) may use grammar correction to correct the text of the comment 1212. The grammar of the corrected text is compared to that of the uncorrected text. The more similar the corrected and uncorrected text are, the more eloquent the content. The comment classifier 1202 may indicate that the Eloquent label applies to the comment 1212 if the similarity is greater than a threshold value, e.g., 0.75 on a scale of 0 to 1. The degree of similarity is a degree to which the label 1212 applies to the comment 1212. Alternatively, the comment classifier 1202 may output the Eloquent label as label 1216, and the degree of similarity as confidence 1218, so that a determination may later be made as to whether the label applies to the comment based on the confidence value 1218. Thus, the confidence value 1218 produced by the classifier for the comment 1212 may be based on the degree of similarity so that, e.g., higher quality grammar produces a higher confidence value for the Eloquent label. The confidence value may subsequently be used to generate a signal value proportional to the confidence value. Alternatively, or in addition to the confidence value 1218, the comment classifier 1202 may output a value indicating a degree to which the label 1216 applies to the comment 1212.

To determine whether the anecdotal label applies to the comment 1212, the anecdotal feature extractor (or, alternatively, a labeling process separate from the comment classifier 1202) may search the text of the comment 1212 for personal pronouns such as she, he, we, you, they, etc. The more personal pronouns in the comment text, the more likely the comment is anecdotal, e.g., a personal story. Thus, the confidence value 1218 may be set to a value proportional to the number of personal pronouns in the comment text. The anecdotal label may be output as the output label 1216 if the number of personal pronouns is greater than a threshold value, e.g., 3 personal pronouns, or if the ratio of personal pronouns (e.g., the number of personal pronouns divided by the number of words in the comment) is greater than a threshold value, e.g., 0.2, 0.4, or the like. Alternatively, the anecdotal label may be output regardless of the number or ratio of personal pronouns, and the confidence value may be used subsequently to determine if the confidence (e.g., number or ratio of personal pronouns) is sufficient to apply the anecdotal label to the comment 1212.

In particular embodiments, if the comment 1212 is in a foreign language, the comment may be translated into English, and personal pronouns may be detected in English. Anecdotal comments are not necessarily always good or bad. In certain circumstances, anecdotal comments may be enjoyable and of interest to the user community, and in other circumstances, anecdotal comments may be out of scope or not appropriate for the comment thread. An attempt may be made to recognize, for a given social-network entity, what kind of interaction is appropriate for corresponding community for interacting with the entity's page (or profile). For example, anecdotal comments may be appropriate on pages that are related to stories or other subjective content, such as pages that are known to publish personal stories or anecdotes, but not appropriate on pages that publish financial news or other objective content. The rankings for anecdotal comments may then be adjusted on a per-page basis. For example, the signal value for an anecdotal comment may be set to a positive value greater than zero to up-rank anecdotal comments for pages on which anecdotal comments are appropriate, or a negative value to down-rank anecdotal comments for pages on which anecdotal comments are not appropriate.

To determine whether the descriptive label applies to the comment 1212, the descriptive feature extractor (or, alternatively, a labeling process separate from the comment classifier 1202) may count the number of adjectives and adverbs in the comment, and set a descriptive signal value proportional to that count. As another example, the presence of words known to be used in descriptive, ornate, or flowery language may be used as a descriptive feature that indicates the comment is likely descriptive. As another example, if the comment has good grammar and contains many different adjectives and nouns (e.g., at least 50% of the words in the text are unique nouns or adjectives), then the comment is likely descriptive.

To determine whether the promotional label applies to the comment 1212, the promotional feature extractor (or, alternatively, a labeling process separate from the comment classifier 1202) the presence of words known to be used in promotional language may be used as an promotional feature that indicates the comment is likely promotional. As another example, the comment may be evaluated by a spam filter. If the comment is likely to be spam, then it is also likely to be promotional.

In particular embodiments, the social-networking system 160 may determine a score for each of the comments, where the score is based on one or more signals associated with the comment, and the signals are related to the labels associated with the comment. As described with reference to FIG. 4A, a comment's ranking score may be a sum of the signal values that are based on the comment, and each of the labels identified for a comment by the comment classifier 1202 may be mapped to a positive or negative signal value. Thus the signal value(s) used to score a comment may be based on the label(s) identified for the comment.

As an example and not by way of limitation, labels that denote positive qualities, such as the Eloquent and Descriptive labels, may be mapped to positive signal values that contribute to raising the comment's ranking score. Each label that denotes positive qualities, such as the eloquent and descriptive labels, may be mapped to a static signal value that is 0 if the label does not apply to the comment, or a constant positive value if the label does apply to the comment. (optionally, with at least a threshold confidence, such as 0.75 or 0.9 confidence). For example, the eloquent label may be mapped to an eloquent signal that is 0 for a comment if the eloquent label does not apply to the comment, or a positive value (e.g., 0.1, 0.4, or other appropriate value) if the eloquent label does apply to the comment. Signals corresponding to other positive labels, such as a descriptive signals, may be determined similarly.

As an example and not by way of limitation, labels that denote negative qualities, such as the Promotional label, may be mapped to negative signal values that contribute to lowering the comment's ranking score. Each label that denotes negative qualities, such as the promotional label (though promotional content is not necessarily negative in other examples), may be mapped to a static signal value that is 0 if the label does not apply to the comment, or a constant negative value if the label does apply to the comment. (optionally, with at least a threshold confidence, such as 0.75 or 0.9 confidence). For example, the promotional label may be mapped to a promotional signal that is 0 for a comment if the promotional label does not apply to the comment, or a negative value (e.g., −0.1, −0.4, or other appropriate value) if the promotional label does apply to the comment. Signals corresponding to other negative labels, such as anecdotal signals (if anecdotal comments are considered negative), may be determined similarly.

As an example and not by way of limitation, instead of being mapped to a constant signal value, labels may be mapped to a dynamic signal value that varies based on how well the label 1216 fits the comment 1212. As an example and not by way of limitation, the signal value may be equal to or based on the confidence value 1218 produced by the comment classifier 1202. The signal value may be positive when the label is categorized as a positive label, or negative when the label is categorized or as a negative label. For example, the comment classifier 1202 may output the eloquent label for the comment "Man Beats Train" with a confidence 1218 of 0.8, and the eloquent label for the comment "I read this article on uknews.com" with a confidence of 0.5. Although the static eloquence signal values are the same for both comments (e.g., 0.1 or 0.4), the dynamic eloquence signal values depend on the confidence values, and are 0.8 for "Man Beats Train" and 0.5 for "I read this article on uknews.com." Signal values for other labels may be determined in a similar manner.

In particular embodiments, the signals associated with each comment may be based on a combination of the labels associated with the comment and demographic information associated with the target user. The sign and/or value of a signal for may depend on demographic information of the target user. As an example and not by way of limitation, the target user's country of residence may determine whether a comment that contains the word "sale", a noun, and the name of a country is promotional. If the country named in the comment is the same as the target user's country of residence, then the comment may be more likely to be promotional, such as an advertisement of an item for sale, an indication by the comment classifier's that the comment is promotional may be used in comment ranking. However, if the country named in the comment is different from the target user's country of residence, then the comment may be less likely to be promotional, such as an international news story about a sale of an item such as a business. In this case, the comment is not promotional, even if the comment classifier indicates that the promotional label applies to the comment. The promotional signal's score may then be set to zero or a smaller value, or reduced for use in comment ranking, because of the difference between the country of residence and the country named in the comment.

In particular embodiments, different scores may be determined for the comment based on different demographic information associated with different target users. For example, the promotional signal value for a target user who lives in a country named in the comment described above is determined by the comment classifier 1202 and is a value indicating that the comment is promotional, which decreases the ranking of the comment. However, the promotional signal value for a target user who does not live in the country named in the comment may be set to zero so that the ranking of the comment is not affected, or to a value that increases the ranking of the comment, because the comment referring to an object in or related to a different country is less likely to be promotional.

In particular embodiments, the social-networking system 160 may track label preferences of the target user. The label preferences may indicate one or more of the labels for which the target user has an affinity. For example, if the user particularly likes eloquent prose, then the social-networking system 160 may store a preference indicating that the user has an affinity for comments labeled eloquent. When a comment labeled eloquent is identified, the signal value may be increased by an appropriate quantity, e.g., incremented by a value such as 0.3 or 0.5 or, if the signal value is positive, multiplied by a factor such as 2 or 3 (up to a maximum value of 1.0).

In particular embodiments, the affinity of the target user for a particular label may be based on interactions between the target user and comments associated with the particular label. The social-networking system 160 may record the number of times that the target user likes or shares (and/or the amount of time the target user spends reading) comments, and the label(s) associated with those comments. If the number of likes or shares, or the amount of time spent reading, exceeds a respective threshold, e.g., 10 likes or 30 aggregate minutes reading, then the social-networking system 160 may store an indication of the user's affinity for the label(s) in the user's label preferences, so that the signal values of comments having those labels are increased as described above.

Figure 10:
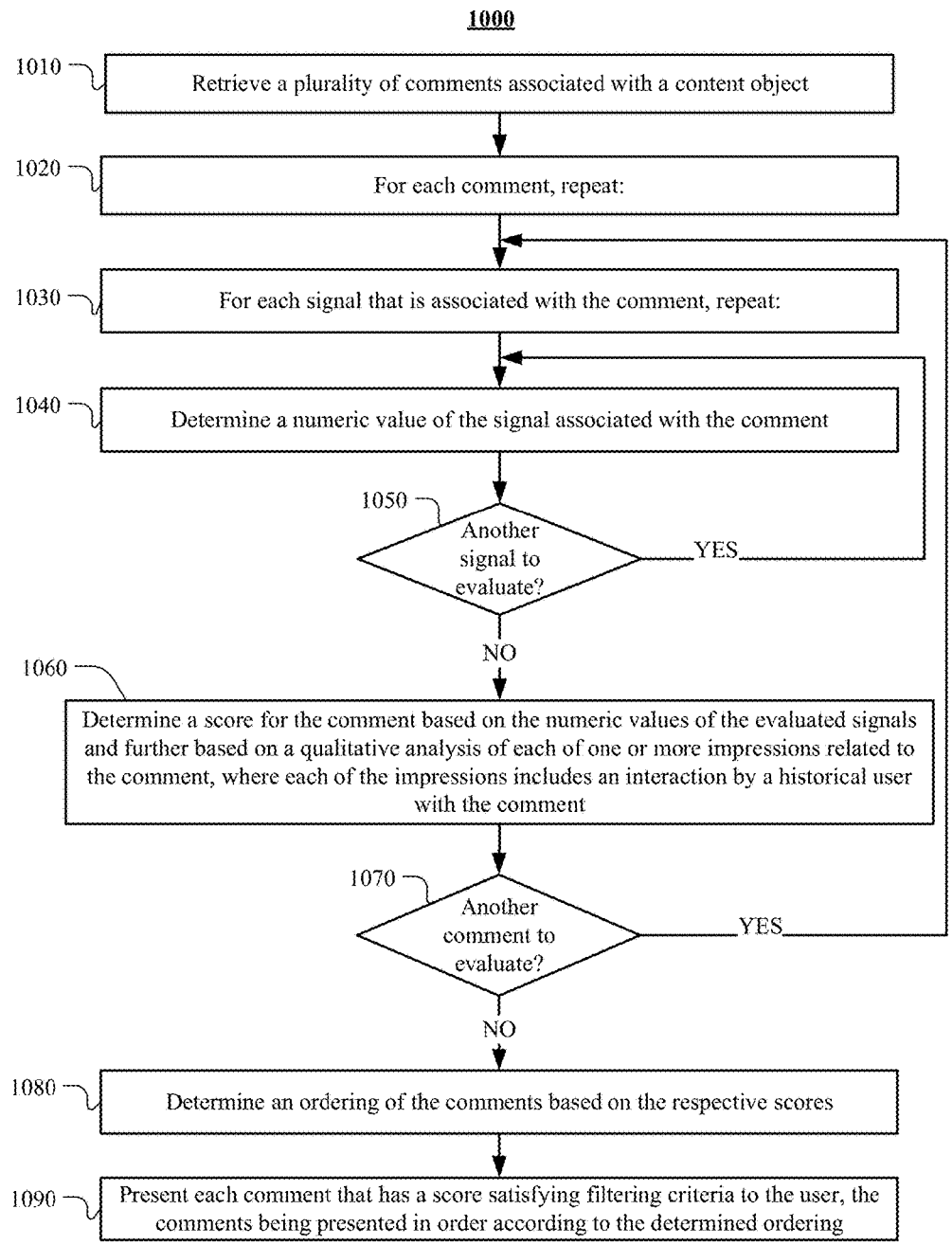
FIG. 10 illustrates an example method for ranking and filtering comments based on impression calculations that include interactions by historical users with the comments.

FIG. 10 illustrates an example method for ranking and filtering comments based on impression calculations. The method may begin at step 1010, where the social-networking system 160 may retrieve a plurality of comments associated with a content object such as a post. At step 1020, the social-networking system 160 may prepare to repeat the subsequent steps (e.g., steps 1030 through 1060) for each retrieved comment. At step 1030, the social-networking system 160 may prepare to repeat the subsequent step (e.g., step 1040) for each signal that is associated with the retrieved comment and matches criteria for selecting signals to evaluate as described with reference to any of FIGS. 6-9. Step 1030 may identify each signal as described with reference to FIG. 11. At step 1040, the social-networking system 160 may evaluate the signal associated with the current comment by determining a numeric value of the signal based on information appropriate for the type of signal, as described with reference to any of FIGS. 6-9. Step 1040 may also store the determined numeric value in memory for use at step 1060. At step 1050, the social-networking system 160 may determine whether there is another one of the signals identified at step 1030 to evaluate, e.g., another signal that is associated with the current comment and satisfies the conditions specified in step 1030. If so, step 1040 is executed again for the next signal associated with the current comment. If there is not another signal to evaluate, step 1060 is executed. At step 1060, the social-networking system 160 may determine a score for the comment based on the numeric values of the signals evaluated at step 1040 and further based on a qualitative analysis of each of one or more impressions related to the comment. Each of the impressions may include an interaction by a historical user with the comment, and the impression may be used to determine the score for the comment as further described with reference to FIG. 13. At step 1070, the social-networking system 160 may determine whether there is another comment to evaluate, e.g., another comment in the set. If so, step 1030 is executed for the next comment. If not, step 1080 is executed. At step 1080, the social-networking system 160 may determine an ordering of the comments based on the respective scores. At step 1090, the social-networking system 160 may filter the comments according to filtering criteria and display the filtered comments in the determined order.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for ranking and filtering comments based on the author-related and content-related features of the comments including the particular steps of the method of FIG. 10, this disclosure contemplates any suitable method for ranking and filtering comments based on the author-related and content-related features of the comments including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

In particular embodiments, the social-networking system 160 may retrieve a plurality of comments 1320 associated with a content object such as a post 304. The comments 1320 are displayed in a region of a user interface 1302. The comments 1320 may, for example, be submitted by users of the social-networking system 160 as responses to the post 304. Previously-submitted comments 1320 may be retrieved by a server 162 from a data store 164 hosted by the social-networking system 160.

In particular embodiments, the social-networking system 160 may determine a score for each of a plurality of comments. The score for each comment in the plurality of comments may be based on one or more signals associated with the comment. The signals may be determined using any of the techniques described herein with reference to FIGS. 5A-C and the flowcharts of FIGS. 6-9, e.g., based on the comment author, content, audience, and labelling, and/or user feed interaction history.

Figure 13:
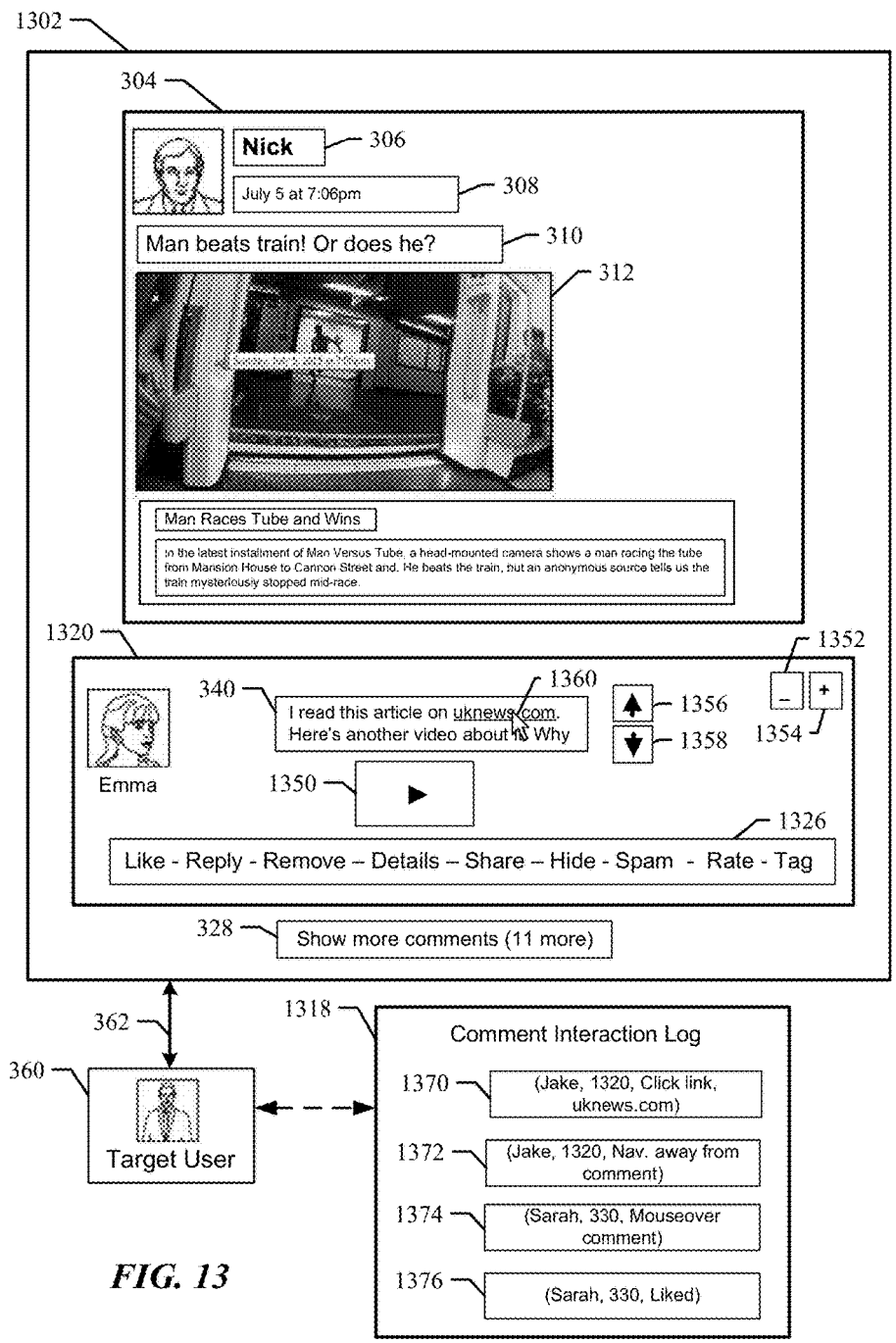
FIG. 13 illustrates an example of a user interface via which a target user may interact with posts and comments.

In particular embodiments, the score for each comment may be further based on a qualitative analysis of each of one or more impressions related to the comment, as illustrated in the flowchart of FIG. 10. Each of the impressions may include an interaction by a user with the comment. FIG. 13 illustrates an example of a user interface 302 that includes user interface elements via which a target user 360 may interact with one or more posts 304 and with one or more comments 1320. The user interface 302 may be presented by a web browser 132 or native application on a display of the client system 130. As an example and not by way of limitation, the target user 360 may use the user interface 302 to view the post 304 and the comments 320. The target user 360 may also use an input device of the client system 130, such as a touch screen, mouse, keyboard, or the like, to provide input to the user interface 302 to perform actions related to the comment 1320, e.g., by selecting one of the elements of the user interface, such as a comment text field in which the comment text 340 is displayed, a video content player 1350, up-rank and down-rank buttons 1356, 1358, and minimize and maximize buttons 1352, 1354. The elements of the user interface 302 also include action menu 1326, which displays the names of actions, e.g., Like, Reply, Remove, and so on, which may be selected by the target user 360 to perform the respective social network actions, e.g., liking, replying to, or removing a post.

In particular embodiments, an impression may be an interaction 362 between a target user 360 and the comment 1320. The target user 360 may interact with the comment 1320 via the user interface 1302 of a client system 130 (e.g., a mobile device or other computer system). The interaction 362 may include displaying the comment 1320 for viewing by the target user 360. For example, the comment text 340 and other comment content, such as a video 1350, may be displayed on the client system 130. The interaction 362 may also include receiving input related to the comment 1320 from the user. For example, the comment text 340 may be displayed in an editable input field that can receive text input from the user. The other elements of the user interface 1302, such as the action menu 1326, a comment up-rank button 1356 and down-rank button 1358, a comment minimize element button 1352 and maximize button 1352, a "Show more comments" button 328, may be selected by the user to cause corresponding actions to occur. For example, a user may select a Like option from the action menu 1326 to like the comment 1320, or the user may select the down-rank button 1358 to move the comment down to a lower ranking in the list of comments associated with the post 304.

As introduced above, the score for each comment may be based on a qualitative analysis of each of one or more impressions related to the comment, and each of the impressions may include an interaction 362 by a user with the comment. The interactions 362 on which the score is based may be interactions that occurred in the past between a user 360 and the comment 1326. When a comment is being viewed or interacted with, the user who is interacting with the comment may be referred to as a "target user." Upon completion of the interaction, a record of the interaction is stored in an entry in the interaction log. The interaction log entry may include a comment identifier identifying the comment, and a user identifier identifying the historical user who interacted with the comment. Other information may be included in the log entry.

For example, each interaction 360 between the target user 360 and an element in the user interface 320 related to the comment 320 may be stored in the comment interaction log 1318 in a format such as (user, comment identifier, interaction type, interaction parameters). As shown in FIG. 13, the comment interaction log 1318 may be stored separately from the user interaction log 1118 that stores feed interactions. Alternatively, the comment interactions 362 may be stored in the user interaction log 1118 or other appropriate data store.

The client system 130 may record the interactions in an interaction log. Since the interactions in the log occurred in the past, the users identified in the log entries are referred to as historical users. Interactions 360 between the target user and the comments 320 may be stored in the log when, for example, a score is computed for the comment 320. The comment interaction log 1318 may be similar to the user interaction log 1118 that stores feed interactions, as described above with reference to FIG. 11, but the comment interaction log 1318 stores the interactions 360 between the target user 360 and the user interface elements of the comment 1320.

The comment interaction log 1318 includes a first entry 1370 (Jake, 1320, Click link, uknews.com), which represents an interaction by the user Jake with the comment 1320 in which Jake clicked (e.g., selected) the link "uknews.com." In this example, the clicked link "uknews.com" is an additional parameter associated with the Click link interaction. A second log entry 1372 (Jake, 1320, Navigate away from comment) represents an interaction by Jake with the comment 1320, in which Jake navigated away from the comment (e.g., by clicking the link "uknews.com", though navigation away from a comment may occur in other cases, e.g., when the user closes the web browser or clicks a back button of the browser to leave the web page). A third log entry 1374 (Sarah, 330, Mouseover comment) represents an interaction by the user Sarah with the comment 330 in which Sarah moved a mouse pointer over the comment 330. A fourth log entry 1376 (Sarah, 330, Liked) represents an interaction by Sara with the comment 330 in which Sarah Liked the comment 330.

In particular embodiments, each entry in the comment interaction log 1318 may include a timestamp, which can be used to determine the length of time between successive interactions. For example, the elapsed time that Sarah spent reading the comment 330 may be determined by subtracting the timestamp of Sarah's Liked interaction from the timestamp of Sarah's Mouseover comment interact 1376. As another example, two interaction log entries that are results of the same user action may both have the same timestamp. Thus, if the entries for Jake clicking the link "uknews.com" 1370 and Jake navigating away from the comment 1372 were generated as a result of Jake clicking the "uknews.com" link, then both entries may be assigned the same timestamp.

There may be one or more categories of interactions, and the qualitative analysis may determine the category of interaction for each impression. The category of interaction for an impression may be determined based on the user input received in the interaction 362, such as the input received from the input device of the client system 130, such as touch screen input, mouse input, keyboard input, or the like. For example, if the input is a mouse cursor position located at coordinates that correspond to the coordinates on which the comment 1320 is displayed on the screen of the client system, then the category of interaction may be identified as a mouseover with respect to the comment 1320.

In particular embodiments, a score for each comment 1320 may be determined based on a number of interactions with the comment 1320. The interactions may be divided into three categories: interactions that indicate the user is interacting with the comment, interactions that indicate the user is imminently stopping interactions with the comment, and interactions that indicate the user has previously stopped interaction with the comment. Interactions in the first two categories may increase the comment's score, e.g., by a value such as 0.2 for the first category and 0.1 for the second category, or other appropriate score value. Interactions in the third category may have no effect on the comment's score.

In particular embodiments, as introduced above, interactions in certain categories may indicate that a user is interacting with the comment and has not moved on to interacting with something other than the comment. In this case, the score of the comment may be incremented, e.g., by a first value such as 0.2. Interactions in this category include the following:

A mouseover with respect to the comment 1320—if the input is a mouse cursor position located at coordinates that correspond to the coordinates on which the comment 1320 is displayed on the screen of the client system, then the category of interaction may be identified as a mouseover with respect to the comment 1320.

User input requesting expansion of the comment 1320—may be identified by received user input that includes a mouse click on a comment expansion icon 1354 displayed for the comment 1320.

Clicking on a media item embedded in the comment—may be identified by user input that selects a media item such as the video 1350.

Clicking on a link in the comment—may be identified by user input that includes a mouse click associated with the coordinates of a link, such as the mouse click 1360 on the link "unknews.com" in the comment 1340.

Submitting a reply to the comment—may be identified by user input that includes a mouse click on the word "Reply" in the action menu 1326.

Indicating a Like for the comment—may be identified by user input that includes a mouse click on the word "Like" in the action menu 1326.

Up-ranking or rating the comment positively—may be identified by user input that includes a mouse click on a comment up-rank icon 1356 or a Rate action in the action menu 1326 that rates the comment at or above 50%. For this interaction, a degree of the interaction may be set to a positive value proportional to the number of positions by which the comment is down-ranked, or to the rating.

Down-ranking or rating the comment negatively—may be identified by user input that includes a mouse click on a comment down-rank icon 1358 or a Rate action in the action menu 1326 that rates the comment below 50%. For this interaction, a degree of the interaction may be set to a negative value proportional to the number of positions by which the comment is down-ranked, or to the rating.

Hiding the comment—may be identified by user input that includes a mouse click on the word "Hide" in the action menu 1326.

Requesting metadata associated with the comment—may be identified by user input that includes a mouse click on the word "Details" in the action menu 1326.

Saving a media item embedded in the comment or saving an attachment to the comment—These categories may be identified by user input that includes a right mouse click on the video content item 1350, or on an attachment to the comment (not shown), respectively, and selection of a Save menu item from a menu that appears in response to the right mouse click.

Sharing the comment—may be identified by user input that includes a mouse click at coordinates of the word "Share respectively in the action menu 1326.

Scrolling down within the comment—may be detected by user input that scrolls the comment down (e.g., selection of a scroll bar located along an edge of the comment text 340, or a touch scroll gesture on the text input field 340, so that the comment at least partially disappears.

Highlighting a portion of the comment—may be identified by user input that selects one or more characters of the comment text 340 in the comment text input field.

Maintaining display of at least a portion of the comment after another interaction with the comment—may be identified by identifying, in the comment interaction log, a first interaction with the comment 1320 followed by absence of another interaction (that would indicate the comment is no longer displayed) for at least a threshold period of time. Alternatively, this category may also be identified by an occurrence of a second interaction with the comment 1320 subsequent to the first interaction.

In particular embodiments, as introduced above, interactions in certain categories may indicate that the user is stopping interaction with the comment, e.g., the interaction is with the comment, but is the last interaction with the comment prior to an interaction with something else. In this case, the score of the comment may be incremented, e.g., by a second value such as 0.1 that is less than the first value, but not necessarily zero. Such categories of interaction may include navigating away from the comment. This category of interaction may be identified by user input that selects a user interface element of a different comment 330, such as an item on an actions menu of another comment 330, or by user input that selects a UI element of a the post 304 or another post, or by user input that selects a user interface element that is not part of the comment 1320. This category of interaction may also be identified by a user selecting or clicking a navigation button of the web browser or application, such as a Back button. This category of interaction may also be identified by scrolling away from the comment so that the comment at least partially disappears, or completely disappears. This category of interaction may also be identified by receiving input that switches the client application's content, e.g., by switching to a different window, screen, or page of the application on which the comment is not displayed. The client application may be a web browser, mobile application, or other application located on the client system. This category of interaction may also be identified by receiving input that sends the client application to the background. This category of interaction may be determined by user input that selects a user interface element of the comment 1320 that causes navigation away from the comment, such as the link uknews.com of the text 340, which causes navigation to the uknews.com link. As another example, this category may be determined by user selection of a link to a page that is unrelated to the comment 1320, but selection of a link to a page that is related to the comment 1320 may not be in this category, since selection of a related page may be considered to be continued interest in the comment by the user.

In particular embodiments, as introduced above, interactions in certain categories may indicate that the user has previously stopped interaction with the comment, e.g., the interaction is with something other than the comment. In this case, the score of the comment may be unchanged, since there is no interaction with the comment in this case. These categories of interaction may include terminating the application. This category of interaction may be detected by input that selects a Quit option from a menu of the application, closes the application's window, or otherwise closes the application. As the application may be unable to create any comment log entries after terminating, the absence of a log entry for a threshold period of time, e.g., 5 seconds, 30 seconds, or the like, may indicate that the application has terminated. As another example, termination of the application may be detected when the client system's display is powered off, or the client system itself is powered off.

In particular embodiments, interactions in certain categories may be used to determine an amount of time the target user has spent viewing a comment. A score for the comment may then be determined based on the time that users have spent viewing the comment. An interaction that indicates the user is viewing the comment may indicate a start time (which may be specific to the comment and user). An interaction that indicates the user is leaving or otherwise no longer viewing the comment may indicate a stop time. The time spent on the comment by the user may then be determined by identifying each stop time in the log and, for each stop time, searching backwards in logged time for the earliest start time associated with the comment and user, such that there are no stop times between the earliest start time and the identified stop time. A sum of the time spent by all users who have interacted with the comment may be determined for a certain time period (e.g., the past hour, the current day, the past 5 days, or the like). The sum of time spent by all users may then be used as a ranking score for the comment, so that the comment having the highest total time spent by users is ranked higher than all other comments evaluated for the time period. Alternatively, the time spent on a comment may be represented as a degree of interaction, and a total value of the degree of interaction may be calculated for the comment and used as the basis for determining the comment's ranking position.

In particular embodiments, the qualitative analysis may determine a degree of interaction for each of the impressions. The degree of interaction may include how quickly the interaction took place, whether the interaction was retracted, edited, or deleted, whether the historical user repeated the interaction. For example, the degree of interaction may be based on an amount of elapsed time between a user's selection of a comment for viewing and the user's subsequent selection of a back button or other user interface feature that retracts the user's selection of the comment. As an example, if the amount of elapsed time is less than a threshold value, e.g., less than 1 second, less than 2 seconds, or the like, then the user's selection of the comment may be assigned a degree that tis small or zero. If the amount of elapsed time is greater than the threshold, then the comment may be assigned a degree value proportional to the amount of elapsed time. How quickly the interaction took place may be determined based on the amount of time a user spent interacting with a graphical user interface element, such as a scrollbar of the content text window. For example, the degree may be proportional to the amount of time the user spent scrolling through the comment text. The degree of interaction may also include how quickly/soon the interaction was retracted, edited, or deleted, by whom the interaction was retracted, edited, or deleted. That is, whether the interaction was retracted, edited, or deleted by the historical user, the comment posting user, or an administrator.

In particular embodiments, the category of interaction for the impression may include user input submitting a reply to the comment, and the qualitative analysis may assess a degree of quality of the reply. That is, the quality of the reply may be used as a basis for determining a degree of the reply interaction. As an example and not by way of limitation, if the reply is generic, e.g., not related to the comment 1320, contains text known to be used in generic replies (e.g., "?", "LOL", "thanks", "yes", "no", emoji, and so on) then the comment's degree may be decreased by a fixed value such as 0.1, or by a value proportional to the brevity or length of the comment. The degree of a repetitive comment, e.g., having text that repeats words and/or phrases, may also be reduced by a fixed value or by a value proportional to the number of repeated words and/or phrases. Conversely, the degree of a comment that is thoughtful or detailed may be increased by a constant value or by a value proportional to the comment's length or detail.

In particular embodiments, the impressions may comprise a viewing impression that comprises an interaction associated with viewing the comment and a navigation impression that comprises an interaction associated with navigation away from the comment, and the degree of interaction comprises an amount of elapsed time between the interaction associated with viewing the comment and the interaction associated with navigation away from the comment. The elapsed time may correspond to an amount of time the user spent viewing the comment prior to navigating away from the comment.

In particular embodiments, determining the score may be based at least in part on a collective qualitative analysis of a subset of the impressions for the comment. That is, the score may be determined based on selected impressions for the comment. The subset of impressions may share a common property, such as impressions that were interacted with by friends of the target user, by users who have an affinity with the target user (the affinity satisfying a threshold level of affinity), by users who share a user-designated interest with the target user, by users who belong to a group, or by users who share one or more demographic traits, e.g., age group, city of residence, nationality, and the like. The collective qualitative analysis may be based on a number of different types of interactions for the impressions in the subset. The subset of impressions may include one or more impressions having timestamps within a threshold recent period of time.

In particular embodiments, the subset of impressions may include a viewing impression that includes an interaction associated with viewing the comment and a navigation impression that includes an interaction associated with navigation away from the comment, and the navigation interaction may occur at least a threshold time after the viewing interaction. The threshold time may correspond to an amount of time the user spent viewing the comment prior to navigating away from the comment.

In particular embodiments, the subset of impressions may include one or more impressions satisfying a threshold degree of interaction, or one or more impressions within a particular category of interaction. That is, the subset may include one or more of the impressions for which a user node representing the historical user is connected to a user node representing the target user by one or more edges in a social graph for a social-networking system. The subset may include one or more of the impressions for which a calculation of affinity between the historical user and the target user satisfies a threshold level of affinity, or the subset may include one or more of the impressions for which the historical user and the target user share a user-designated interest, both belong to a group, or share one or more demographic traits. The subset may include one or more of the impressions for which both the historical user and the target user have been invited to an event. The subset may include one or more of the impressions having a timestamp within a threshold recent period of time, one or more impressions satisfying a threshold degree of interaction, or one or more impressions within a particular category of interaction.

The subset may include one or more of the impressions for which both the historical user and the target user are identified as participants in an event. The event may be a representation of a real-world event, e.g., a conference, music performance, festival, or other real-world event that social-network users may attend. The subset may include one or more of the impressions for which both the historical user and the target user are verified as having attended an event. The subset may include one or more of the impressions for which both the historical user and the target user have indicated interest in an event, e.g., by following an event page, registering for the event, mentioning or referring to the event in a post or comment, or otherwise interacting with the event page.

Figure 14:
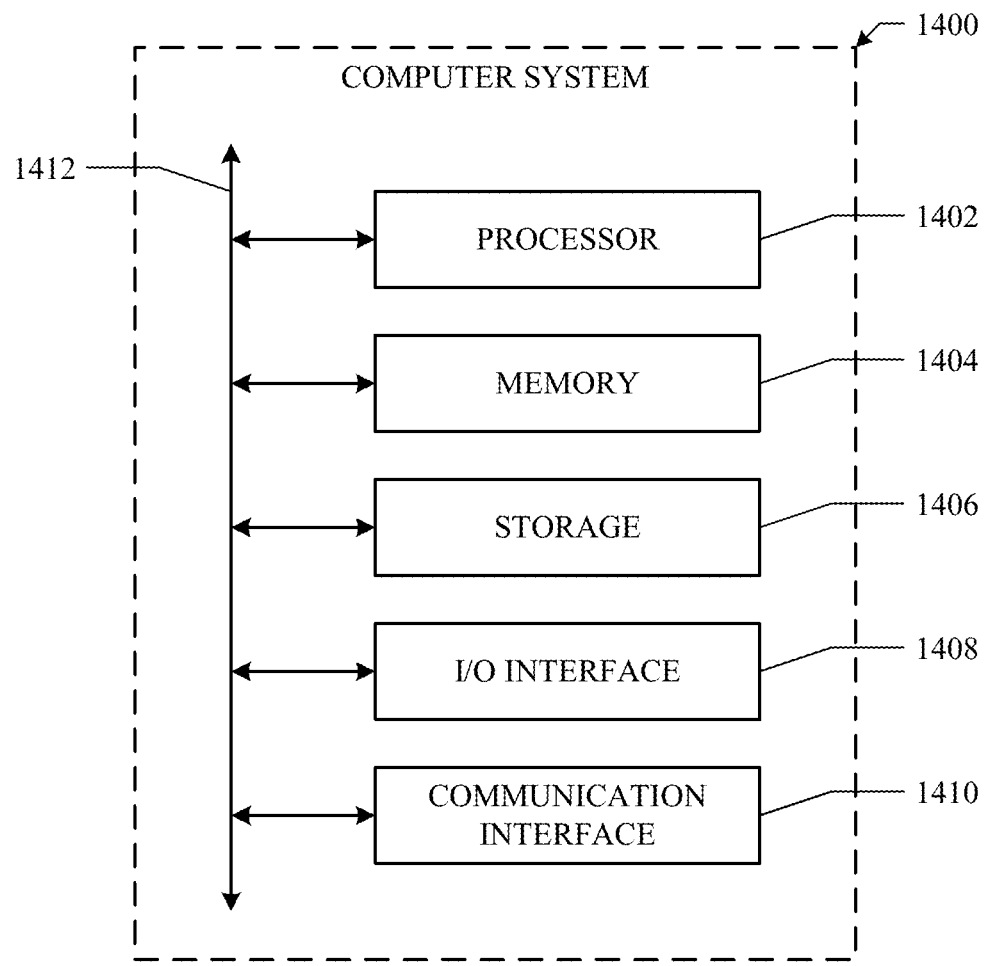
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   by one or more computer systems, retrieving a plurality of comments associated with a content object on a social-networking system;
   by the one or more computer systems, determining a score for each of the comments, wherein the score is based on one or more signals associated with the comment, and wherein the signals are related to the identity of an author of the comment or content of the comment,
   wherein at least one of the signals is based on an originality level of the content of the comment, and the originality level is determined based on a comparison of text of the comment to one or more clusters of similar text in a corpus of text associated with the social networking system;
   by the one or more computer systems, ordering the comments based on the respective scores; and
   by the one or more computer systems, presenting one or more of the ordered comments to a target user.

2. The method of claim 1, wherein the score for each of the comments is determined based upon an average of the respective values of the one or more signals associated with the comment.

3. The method of claim 1, wherein the originality level of the content is inversely proportional to a cluster size of the one or more clusters of similar text.

4. The method of claim 1, further comprising determining the originality level by:
   by the one or more computer systems, identifying the one or more clusters of similar text in the corpus of text associated with the social-networking system, wherein the similar text is similar to text of the content,
   wherein the at least one of the signals is inversely proportional to a cluster size of the one or more clusters of similar text.

5. The method of claim 1, wherein one of the signals is based on a grammar quality level of content of the comment.

6. The method of claim 5, further comprising determining the grammar quality level by:
- by the one or more computer systems, generating corrected text from text of the comment using a grammar correction algorithm; and
- by the one or more computer systems, comparing a grammar quality of the text of the comment to a grammar quality of the corrected text,
- wherein the one of the signals is proportional to the similarity of the grammar quality of the text of the comment to the grammar quality of the corrected text.

7. The method of claim 1, wherein one of the signals is based on whether the content of the comment includes an invalid URL.

8. The method of claim 1, wherein one of the signals is based on a relevance comparison between text of the content object and text of the comment.

9. The method of claim 1, wherein one of the signals is based on a level of promotional content in the comment.

10. The method of claim 1, wherein one of the signals is based on a level of text entropy in the content of the comment.

11. The method of claim 1, further comprising:
- by one or more computer systems, excluding one or more of the comments based on a filtering condition.

12. The method of claim 11, further comprising:
- by one or more computer systems, determining a ratio of unique user mentions in the comment to a quantifying value for the content of the comment, wherein, for at least one of the excluded comments, the respective ratio satisfies a threshold value.

13. The method of claim 1, wherein one of the signals is based on how many times the comment has been (a) liked, (b) hidden, (c) marked as spam, or (d) replied to within a specified period of time.

14. The method of claim 1, wherein one of the signals is based on a reputation of the author of the comment.

15. The method of claim 14, wherein the reputation of the author is based on a number of times content attributed to the author has been (a) liked, (b) hidden, (c) marked as spam, or (d) replied to within a specified period of time.

16. The method of claim 15, wherein the content attributed to the author is limited to comments associated with the content object.

17. The method of claim 1, wherein one of the signals is based on a user verification status of the author.

18. The method of claim 1, wherein one of the signals is based on a number of followers of the author in a social-networking system and further based on satisfaction of a threshold for an author quality level.

19. One or more computer-readable non-transitory storage media embodying software that is operable when executed to:
- retrieve a plurality of comments associated with a content object on a social-networking system;
- determine a score for each of the comments, wherein the score is based on one or more signals associated with the comment, and wherein the signals are related to the identity of an author of the comment or content of the comment,
- wherein at least one of the signals is based on an originality level of the content of the comment, and the originality level is determined based on a comparison of text of the comment to one or more clusters of similar text in a corpus of text associated with the social networking system;
- order the comments based on the respective scores; and
- present one or more of the ordered comments to a target user.

20. A system comprising: one or more processors; and a memory coupled to the processors comprising instructions executable by the processors, the processors being operable when executing the instructions to:
- retrieve a plurality of comments associated with a content object on a social-networking system;
- determine a score for each of the comments, wherein the score is based on one or more signals associated with the comment, and wherein the signals are related to the identity of an author of the comment or content of the comment,
- wherein at least one of the signals is based on an originality level of the content of the comment, and the originality level is determined based on a comparison of text of the comment to one or more clusters of similar text in a corpus of text associated with the social networking system;
- order the comments based on the respective scores; and
- present one or more of the ordered comments to a target user.

* * * * *